United States Patent [19]

Chen et al.

[11] Patent Number: 5,428,803
[45] Date of Patent: Jun. 27, 1995

[54] METHOD AND APPARATUS FOR A UNIFIED PARALLEL PROCESSING ARCHITECTURE

[75] Inventors: Steve S. Chen, Eau Claire; Douglas R. Beard, Eleva; George A. Spix, Eau Claire; Edward C. Priest, Eau Claire; John M. Wastlick, Eau Claire; James M. VanDyke, Eau Claire, all of Wis.

[73] Assignee: Cray Research, Inc., Chippewa Falls, Wis.

[21] Appl. No.: 912,964

[22] Filed: Jul. 10, 1992

[51] Int. Cl.6 .................................................. G06F 3/60
[52] U.S. Cl. ....................................... 395/800; 395/200; 395/425; 364/DIG. 1; 364/229; 364/243
[58] Field of Search ......................... 395/200, 800, 425

[56] References Cited

U.S. PATENT DOCUMENTS

| | | | |
|---|---|---|---|
| 4,130,865 | 12/1978 | Heart et al. | 395/200 |
| 4,365,292 | 12/1982 | Barnes et al. | 395/800 |
| 4,400,768 | 8/1983 | Tomlinson | 395/800 |
| 4,445,171 | 4/1984 | Neches | 395/325 |
| 4,636,942 | 1/1987 | Chen et al. | 395/725 |
| 4,707,781 | 11/1987 | Sullivan et al. | 395/425 |
| 4,720,780 | 1/1988 | Dolecek | 395/800 |
| 4,745,545 | 5/1988 | Schiffleger | 395/325 |
| 4,754,398 | 6/1989 | Pribnow | 395/200 |
| 4,827,403 | 5/1989 | Steele, Jr. et al. | 395/800 |
| 4,834,483 | 5/1989 | Arthurs et al. | 385/46 |
| 4,873,626 | 10/1989 | Gifford | 395/325 |
| 4,891,751 | 1/1990 | Call et al. | 395/800 |
| 4,901,230 | 2/1990 | Chen et al. | 395/325 |
| 5,055,999 | 10/1991 | Frank et al. | 395/425 |
| 5,056,000 | 10/1991 | Chang | 395/325 |
| 5,072,371 | 12/1991 | Benner et al. | 395/200 |
| 5,081,575 | 1/1992 | Hiller et al. | 395/325 |
| 5,113,523 | 5/1992 | Colley et al. | 395/800 |
| 5,165,038 | 11/1992 | Beard et al. | 395/800 |
| 5,179,702 | 1/1993 | Spix et al. | 395/650 |
| 5,197,130 | 3/1993 | Chen et al. | 395/325 |
| 5,208,914 | 5/1993 | Wilson et al. | 395/275 |

OTHER PUBLICATIONS

Fast Interrupt Mechanism for a Multiprocessor System, Ser. No.: 07/536,199, filed on Jun. 11, 1990.

(List continued on next page.)

*Primary Examiner*—Alyssa H. Bowler
*Assistant Examiner*—G. Donaghue
*Attorney, Agent, or Firm*—Schwegman, Lundberg & Woessner

[57] ABSTRACT

A unified parallel processing architecture connects together an extendible number of clusters of multiple numbers of processors to create a high performance parallel processing computer system. Multiple processors are grouped together into four or more physically separable clusters, each cluster having a common cluster shared memory that is symmetrically accessible by all of the processors in that cluster; however, only some of the clusters are adjacently interconnected. Clusters are adjacently interconnected to form a floating shared memory if certain memory access conditions relating to relative memory latency and relative data locality can create an effective shared memory parallel programming environment. A shared memory model can be used with programs that can be executed in the cluster shared memory of a single cluster, or in the floating shared memory that is defined across an extended shared memory space comprised of the cluster shared memories of any set of adjacently interconnected clusters. A distributed memory model can be used with any programs that are to be executed in the cluster shared memories of any non-adjacently interconnected clusters. The adjacent interconnection of multiple clusters of processors to a create a floating shared memory effectively combines all three type of memory models, pure shared memory, extended shared memory and distributed shared memory, into a unified parallel processing architecture.

24 Claims, 12 Drawing Sheets

OTHER PUBLICATIONS

Almasi, G. and Gottlieb, A., *Highly parallel Computing*, Benjamin Cummings 1989, Chpt. 1, "Overview", pp. 2–29, Chap. 8, Interconnection Networks pp. 278–299, Chapt. 10 MIMD Parallel Architectures pp. 354–475.

Gajski, D., Milutinovic, V., Siegel, H., and Furht, B. *Computer Architecture,* The Computer Society of the IEEE, (1987), Chpt. 2, "Topics in Parallel Processing and Multiprocessing", pp. 81–171.

Hennesy, J. and Patterson, D., Computer Architecture: *A Quantative Approach,* Morgan Kaufman (1990), Chap. 10, "Future Directions", pp. 570–592.

Hwang, K. and DeGroot, D., Parallel Processing for Supercomputers and Artificial Intelligence, McGraw Hill Publ., (1989) Chpt. 2, pp. 31–67.

Kain, R., *Computer Architecture,* Prentice Hall, (1989), vol. 1, Chpt. 3, "Shared Resource Synchronization", pp. 178–250.

ETA 10 System Overview: EOS, Tech. Note, Publ. 1006, ETA Systems, Sep. 30, 1988.

Clementi, E., Logan, D., Saarninen, J., "ICAP/3090: Parallel Processing For Large Scale Scientific and Engineering Problems", *IBM Systems Journal,* vol. 27, No. 4 (1988) pp. 475–509.

Pfister, G., "The IBM Research Parallel Processor Prototype (RP3): Introduction and Architecture", Int'l Conf. on Parallel Processing, Aug. 1985, pp. 764–771.

Murakami, K., Akira, F., Sueyoshi, T. and Tomita, S., "An Overview of the Kyushi University Reconfigurable Parallel Processor", Aug. 1988, pp. 130–137.

Kuck, D., Davidson, E., Lawrie, D. and Sameh, A., "Parallel Supercomputing Today and the Cedar Approach", *Science,* vol. 231, Feb. 1986, pp. 967–974.

Goodman, J. and Woest, P., "The Wisconsin Multicube: A New Large Scale Cache–Coherent Multiprocessor", Proc. of the 1988 Int'l Conf. on Parallel Processing, IEEE, Feb. 1988, pp. 422–431.

PRIOR ART
DISTRIBUTED MEMORY MODEL

PRIOR ART
SHARED MEMORY MODEL

PRIOR ART
EXTENDED SHARED MEMORY
SWITCHING NETWORK MODEL

PRIOR ART
EXTENDED SHARED MEMORY
HEIRARCHICAL RING MODEL

PRIOR ART
EXTENDED SHARED MEMORY
RECONFIGURABLE MODEL

PRIOR ART
EXTENDED SHARED MEMORY
CLUSTER/GLOBAL MEMORY INTERCONNECT

PRIOR ART
EXTENDED SHARED MEMORY
CLUSTER MODEL
DIRECT INTERCONNECT

METHOD AND APPARATUS FOR A UNIFIED PARALLEL PROCESSING ARCHITECTURE

RELATED APPLICATIONS

This application is related to the following co-pending applications, all of which are assigned to the assignee of the present invention, the disclosure of all of which are hereby incorporated by reference in the present application.

CLUSTER ARCHITECTURE FOR A HIGHLY PARALLEL SCALAR/VECTOR MULTIPROCESSOR SYSTEM, U.S. Pat. No. 5,197,130, issued Mar. 23, 1993;

METHOD AND APPARATUS FOR NON-SEQUENTIAL RESOURCE ACCESS, U.S. Pat. No. 5,208,914, issued on May 4, 1993;

GLOBAL REGISTERS FOR A MULTIPROCESSOR SYSTEM, U.S. Pat. No. 5,165,038, issued Nov. 17, 1992;

FAST INTERRUPT MECHANISM FOR A MULTIPROCESSOR SYSTEM, Ser. No. 07/536,199, filed on Jun. 11, 1990; and INTEGRATED SOFTWARE ARCHITECTURE FOR A HIGHLY PARALLEL MULTIPROCESSOR SYSTEM, U.S. Pat. No. 5,179,702 issued Jan. 12, 1993.

TECHNICAL FIELD

The present invention relates generally to parallel processing computer systems for performing multiple-instruction-multiple-data (MIMD) parallel processing. More particularly, the present invention relates to a method and apparatus for a unified parallel processing architecture for high performance MIMD multiprocessors that organizes the multiprocessors into four or more physically separable clusters, only some of which are adjacently interconnected, and provides for a shared memory model to be used with programs executed in the floating shared memory space that is defined across any adjacently interconnected clusters, and a distributed memory model to be used with any programs executed across non-adjacently interconnected clusters.

PRIOR ART

The field of parallel computing has received increasing attention in recent years as computer designers seek to increase the effective processing capabilities of computer processing systems. Most of the current work relating to high performance parallel processing has focused on multiple-instruction-multiple-data (MIMD) parallel processing systems. Current architectures for MIMD parallel processing systems use one of two different memory models for sharing data within a program that is to be executed in parallel: distributed memory vs. shared memory. In a distributed memory model, data is stored in the private local memory of each processor and is communicated among processors by some type of message passing scheme. In a shared memory model, data is stored in a common shared memory that is equally accessible to all processors in the parallel processing system. An excellent summary of current MIMD parallel architectures is set forth in Almasi and Gottlieb, *Highly Parallel Computing*, (1989) Chpt. 10, pgs. 354–475.

From the programmer's perspective, the most attractive parallel processing system is one that uses a shared memory model having a globally shared physical address space. A shared address space leaves the choice of the parallel programming model up to the programmer and provides a more flexible problem solution space. In addition, most present software programs are written for a shared memory model, as opposed to a distributed or private memory model. To effectively port an existing software program from a shared memory model to a private memory model can require significant reprogramming effort. One of the primary reasons why it is easier to program a shared memory model is that a distributed memory model necessarily requires that the processes and data which comprise a parallel programming problem be partitioned into separate tasks that are each small enough to fit into the private local memory of a processor and at the same time are large enough to recover the overhead required to establish a parallel task in a message passing environment. In a shared memory model, there are fewer restrictions on the size of the parallel tasks and the overhead required to establish a parallel task can be significantly less than the overhead associated with the more complicated message passing scheme required by a distributed memory model. Thus, it would be desirable to have a parallel processing system which could provide a large and flexible problem solution space for parallel processing wherein a large number of processors all have equal and symmetric access to any and all memory locations in a common shared memory.

Unfortunately, the hardware required to implement such a true shared memory model for a parallel processing system having a large number of processors can be expensive and complicated. While it may be practically possible to directly wire each processor to each bank of memory to allow for equal and symmetric access to the shared memory in a minimally parallel processing system having two, four or eight processors, it is not practically possible to directly wire each processor to each bank of memory in parallel processing systems when the number of processors is greater than about eight. As a result, several types of extended shared memory systems have been proposed when the number of processors in the parallel processing system is greater than about eight.

Currently, most extended shared memory systems use a variety of multi-stage interconnection techniques to connect a local memory that is closely associated with each processor with the local memories of all other processors such that all of the local memories together comprise the globally shared address space of the system, e.g., the BBN Butterfly+, the NYU Ultracomputer and the Thinking Machines, Inc. CM-1. Some extended shared memory systems combine a local memory for each processor with a global memory that operates as a cache write-through or duplicate address space, e.g., the Carnegie-Mellon CM.*. Still other systems provide a reconfigurable memory model where each processor has a memory that can be accessed either locally or globally, and where the boundary between local and global memory can be dynamically adjusted, e.g., the IBM RP3 and U.S. Pat. No. 5,056,000.

The problem with such extended shared memory systems is that memory access is not equal and symmetric from all processors to all memory locations in the extended shared memory. Instead, each processor may encounter different memory latencies when accessing different memory locations in different parts of the extended shared memory address space. This is especially true when comparing the access of a processor to its local memory with the access of that processor to a remote local memory or to a global memory. In essence, only those accesses which are to the local memory of the processor are equal and symmetric; all other memory accesses are variable and, in some cases, even indeterminate. As a result, these systems perform parallel processing best when nearly all of the memory requests for the related data to be operated on by each parallel task are made to the individual local memory of the processor executing that parallel task. When even a small percentage of the memory requests for the related data required by a parallel task must access memory outside the individual local memory, significant degradation of parallel processing performance can occur.

In an effort to increase the portion of an extended shared memory that is not affected by the problems of different latencies in accessing remotely shared memory, at least three different parallel processing systems have incorporated the concept of grouping the shared memory for a multiple number of processors together such that all of the processors in a group have similar access to a shared memory for that group. These groups of processors are then all connected to each other to provide the total extended shared memory space for the parallel processing system.

In the Kendall Square Research KSR-1 supercomputer, the local memories of a group of processors are connected together via a ring bus interconnection to form one of a plurality of segments. The various segments are then connected to each other by a pyramidal hierarchy of "higher" segments, with each higher-level segment having fewer segments than the preceding lower-level segment. Each of the "higher" segments of the domains uses a plurality of transfer units that are also arranged into a ring bus interconnection to transfer memory requests in a distributive hierarchical basis. Although there is a more uniform memory latency among requests to the local memories of other processors in that segment for the processors in the KSR-1 supercomputer, there are still significant differences in memory latencies between a local memory access, a memory access within that segment, and a memory access that is outside of that segment. As a result, it is still necessary to provide for some memory hierarchy optimization of memory requests for each parallel task in order to have a computer program run most efficiently on the KSR-1 supercomputer.

In the University of Illinois Cedar supercomputer, each cluster has eight processors linked by an 8×8 crossbar switch to a 4-way interleaved write-back cache, and on through to a local cluster memory having 32 Mbytes per cluster. Eight clusters are then linked by another 8×8 crossbar switch to a global memory having 8 Mbytes per processor. Transfers from global memory to a cluster memory are accomplished by a block transfer of 32 byte blocks from the global memory through the cache and on to the cluster memory. Each processor may also directly access a portion of the global memory on a byte-by-byte basis. In the case of the Cedar supercomputer, inter-cluster communication is part of a memory-hierarchy model and can be accomplished either by having processors in both clusters write to a common section of the global shared memory, or by a block transfer of the cluster memory, through the global memory, to the other cluster-shared memory. As with the KSR-1 supercomputer, the use of memory hierarchy optimization is a prerequisite to successfully programming a computer program to run most efficiently on the Cedar supercomputer.

In the original supercomputer developed by the assignee of the present invention that is the subject of the previously identified patent application entitled CLUSTER ARCHITECTURE FOR A HIGHLY PARALLEL SCALAR/VECTOR MULTIPROCESSOR, a four cluster parallel processing supercomputer is disclosed. Each cluster includes between 4 and 256 high performance scalar/vector processors which are connected via a unique arbitration node network to a set of interleaved sections of memory that form the cluster shared memory. The processors in each cluster are also directly connected to the clustered shared memory of all three of the other clusters by an additional port in the arbitration node network. Using the cluster architecture of the original supercomputer developed by the assignee of the present invention, a single common address space is defined across the cluster memories of all four clusters, with the only difference between intra-cluster memory requests and inter-cluster memory request being the different memory latency primarily due to the physical distance which separates the clusters. Consequently, it is possible to provide for parallel processing of program throughout the entire address space of the four clusters without the need for a memory hierarchy optimization.

The problem with these cluster-type parallel processing architectures is that all of the clusters must be directly connected together as part of the same single shared address space. Unfortunately, the number of clusters that can be directly interconnected is limited by the cost and complexity required for such interconnections. In the case of the Cedar supercomputer, the complexity and costs of interconnecting additional clusters increases exponentially as more memory is required for the global memory with the addition of each processor, and as larger and larger crossbar switches are required to directly interconnect each cluster to the global. The original supercomputer developed by the assignee of the present invention does not require ever increasing amounts of global memory as the number of processors increases; however, the physical limitations imposed by directly interconnecting each cluster to every other cluster in such a way so as to not significantly increase the memory latency for inter-cluster memory requests make the problem of directly interconnecting a large number of clusters very difficult. An additional physical limitation that restricts the number of clusters which can be interconnected in either of these parallel processing supercomputers is that all of the clusters in either of these cluster-type supercomputers must be physically dose enough to one another such that the clock signals for all of the clusters can be synchronized or suffer the corresponding performance penalties associated with asynchronous communication schemes.

Although cluster-type architectures offer a partial solution to the problem of varying memory latencies, cluster-type architectures are themselves limited by the physical problems associated with directly connecting together all of clusters in order to provide a single common address space for the parallel processing system. Thus, while cluster-type parallel processing architectures, such as the original supercomputer developed by the assignee of the present invention, represent a significant improvement in the design and architecture of high performance parallel processors, it would be advantageous to provide for a unified parallel processing architecture that can allow an effectively unlimited number of clusters of multiprocessors to be interconnected together, and that can overcome the present physical limitations imposed on interconnecting clustered multiprocessors.

SUMMARY OF THE INVENTION

The present invention provides a unified parallel processing architecture for connecting together an extendible number of clusters of multiple numbers of processors to create a high performance parallel processing computer system. The present invention organizes multiple processors into four or more physically separable clusters, each cluster having a common cluster shared memory that is symmetrically accessible by all of the processors in that cluster. Unlike present extended shared memory cluster-type architectures, only some of the clusters are adjacently interconnected in the present invention. A shared memory model can be used with programs that can be executed in the cluster shared memory of a single cluster, or in a floating shared memory that is defined across an extended shared memory space comprised of the cluster shared memories of any set of adjacently interconnected clusters. A distributed memory model can be used with any programs that are to be executed in the cluster shared memories of any non-adjacently interconnected clusters.

In the present invention, clusters are adjacently interconnected to form a floating shared memory if certain memory access conditions relating to relative memory latency and relative data locality can create an effective shared memory parallel programming environment. By adjacently connecting together only those clusters which can satisfy these conditions, the floating shared memory created by the present invention does not have to sacrifice performance for the increased interconnection necessary to increase the size of the problem solution space provided by an extended shared memory model where every processor can access the single shared address space of the floating shared memory. The adjacent interconnection of multiple clusters of processors to create a floating shared memory effectively combines all three type of memory models, pure shared memory, extended shared memory and distributed shared memory, into a unified parallel processing architecture. Thus, the present invention accommodates parallel processing performance first and flexibility of the interconnection of processors and memory second, with the tradeoff between these two considerations balanced at the point at which the performance of inter-cluster memory accesses start to significantly degrade.

The four or more clusters of multiprocessors may be adjacently interconnected using a variety of hardware interconnection topologies. In the preferred embodiment, each of the clusters is a physically separable unit that includes two or more processors, and one or more input/output ports, all of which are symmetrically connected by a node switching mechanism to a homogenous cluster shared memory. For each of the clusters, two or more external cluster connections provide a word-by-word communication path for adjacently connecting the processors in any one cluster to the cluster shared memory of two or more adjacently interconnected clusters. A distributed memory communication mechanism is also used for providing a message passing communication among any non-adjacently interconnected clusters so as to define an extendible address space encompassing the cluster shared memory of all clusters.

To further enhance the parallel processing capabilities of the preferred embodiment of the present invention, each multiprocessor cluster is provided with an extendible clock mechanism and an extendible control mechanism to coordinate parallel processing among clusters. The extendible clock mechanism solves the problem of differing phases and duty cycles in clock signals among physically separable components of the parallel processing system. The extendible control mechanism provides control mechanisms that can be used by a distributively-based operating system to coordinate and communicate among processes executing in parallel in the computer processing system.

Accordingly, it is a primary objective of the present invention to provide a unified parallel processing architecture for connecting together an extendible number of clusters of multiple numbers of processors to create a high performance parallel processing computer system.

Another primary objective of the present invention is to provide a unified parallel processing architecture that can overcome the present physical limitations imposed on interconnecting clustered multiprocessors.

Still another primary objective of the present invention is to provide a unified memory model that uniquely combines the prior art memory models for a shared memory, extended shared memory and distributed memory models.

A further objective of the present invention is to provide a parallel processing computer system that allows for a shared memory model to be used with programs executed in the floating shared memory space that is defined across any adjacently interconnected clusters, and a distributed memory model to be used with any programs executed across non-adjacently interconnected clusters.

Still another objective of the present invention is to provide a clustered multiprocessor system where the physically separable clusters are all interconnected with an extendible clock mechanism that solves the physical problems required by a synchronous clock system in a multiprocessor system with physically separable components.

These and other objectives of the present invention will become apparent with reference to the drawings, the detailed description of the preferred embodiment and the appended claims.

DETAILED DESCRIPTION OF THE PREFERRED EMBODIMENT

To better understand how the present invention provides for a novel unified parallel processing architecture, the various architectures of the prior art parallel processing systems will be briefly described. Basically, the memory models for prior art parallel processing systems can be divided into either distributed memory models, shared memory models or extended shared memory models. Each of these models has certain advantages and disadvantages.

Figure 1A:
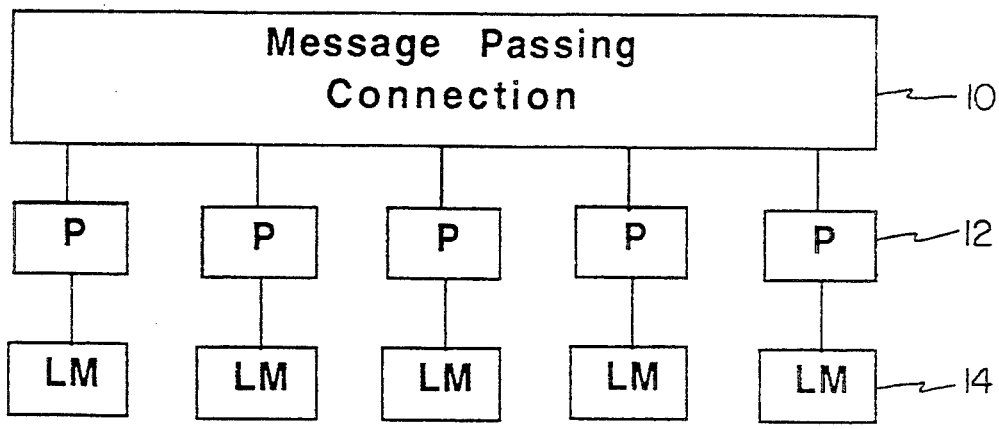
FIGS. 1a and 1b are simplified block diagrams showing the two different basic memory models for parallel processing systems in the prior art, an ideal distributed memory model and an ideal shared memory model, respectively.
Figure 1B:
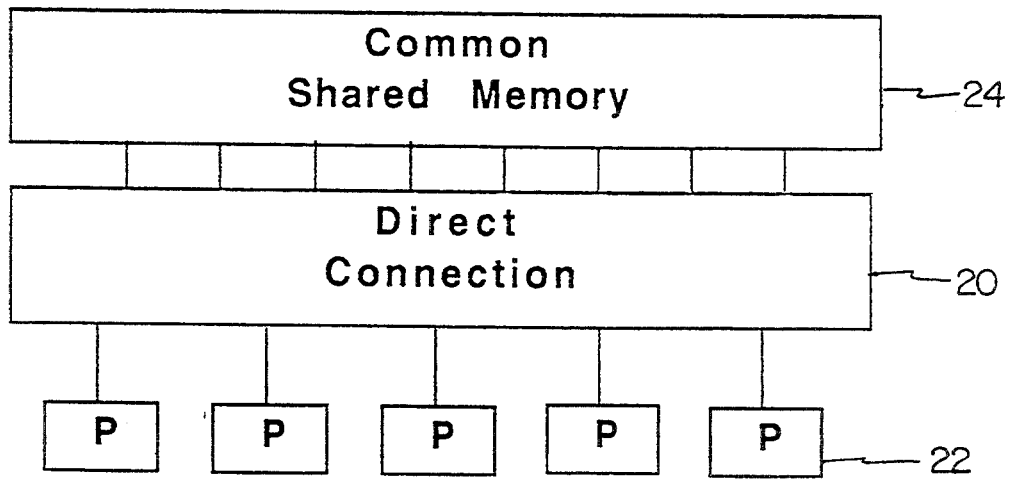

FIGS. 1a and 1b show a simplified block diagram of the interconnection of processors and memory in the two basic memory models for parallel processing systems in the prior art. FIG. 1a shows a message passing connection 10 for interconnecting a plurality of processors 12, each having a local memory 14, to form an ideal distributed memory model parallel processing system. An example of a distributed memory model parallel processing system is the Intel Corp. iPSC supercomputer. Although the distributed memory model can link a potentially unlimited number of processors together as part of a parallel processing system, the major drawback of such a distributed memory model is that each processor 12 only has access to the address space in its own local memory 14. All other inter-processor communication must occur via the message passing connection 10. FIG. 1b shows a direct connection 20 for interconnecting a plurality of processor 22 to a common shared memory 24 to form an ideal shared memory model parallel processing system. An example of a shared memory model parallel processing system is the Cray Research, Inc. Y/MP supercomputer. Although this type of system provides the most flexible parallel processing system, it generally has not been feasible to directly connect more than about eight processors 22 to a single common shared memory 24.

Prior art extended shared memory parallel processing systems have overcome some of the direct connection limitations of the shared memory model parallel processing systems, and have allowed for more processors to be connected to all of the memory components that form the common address space for the parallel processing system. For purposes of the present invention, an extended shared memory model parallel processing system is defined as any parallel processing system where all of the processors are not directly and symmetrically connected to all of the memory, but where all of the memory is part of a single universally accessible address space. FIGS. 2a–2e show a simplified block diagram of the interconnection of processors and memory for some of the various extended shared memory parallel processing systems in the prior art.

Figure 2A:
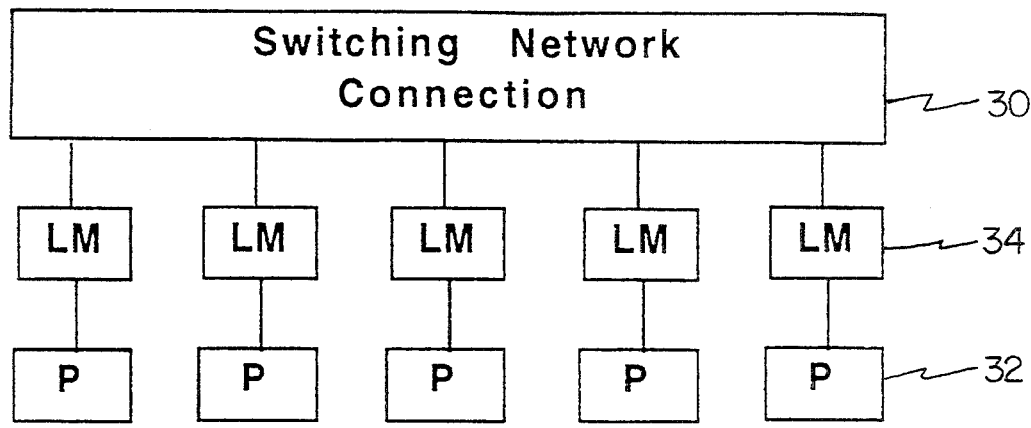
FIGS. 2a, 2b, 2c, 2d and 2e are simplified block diagrams showing several different extended shared memory models for parallel processing systems in the prior art.
Figure 2B:
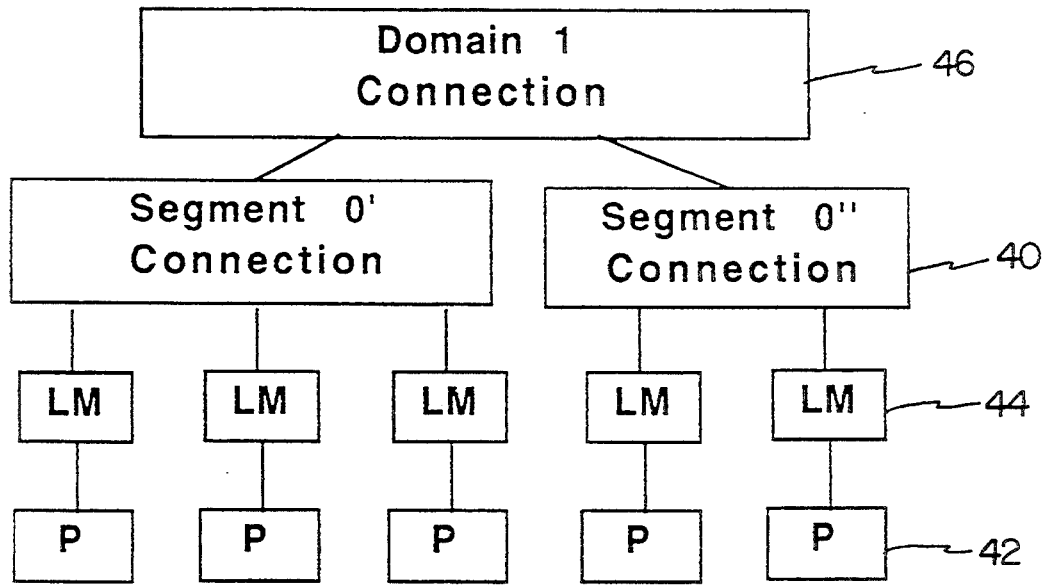
Figure 2C:
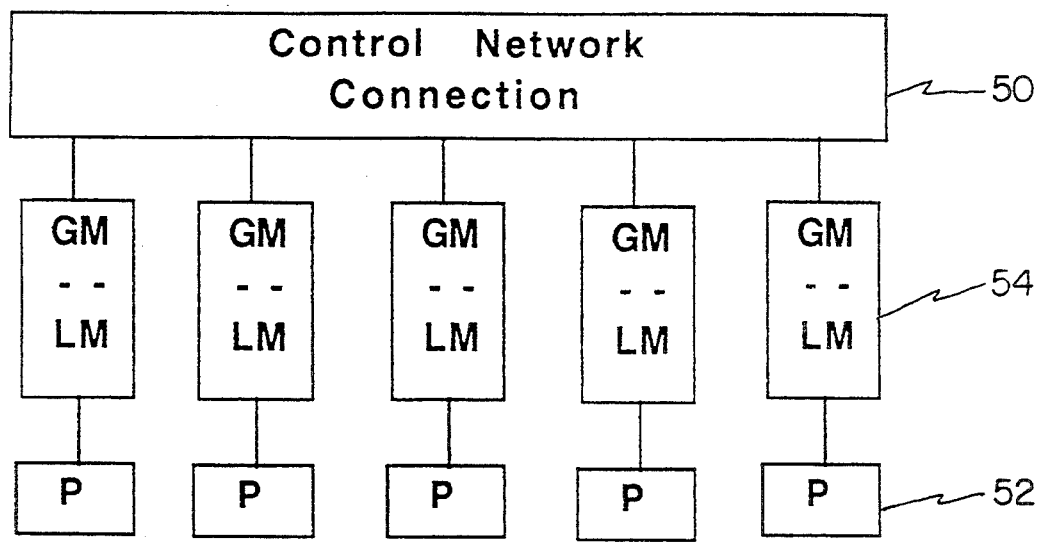
Figure 2D:
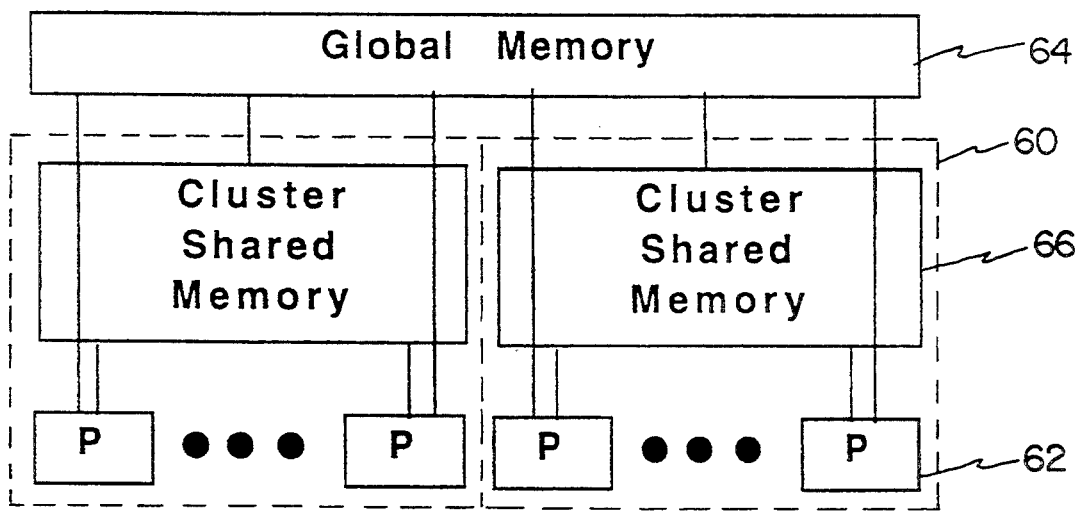
Figure 2E:
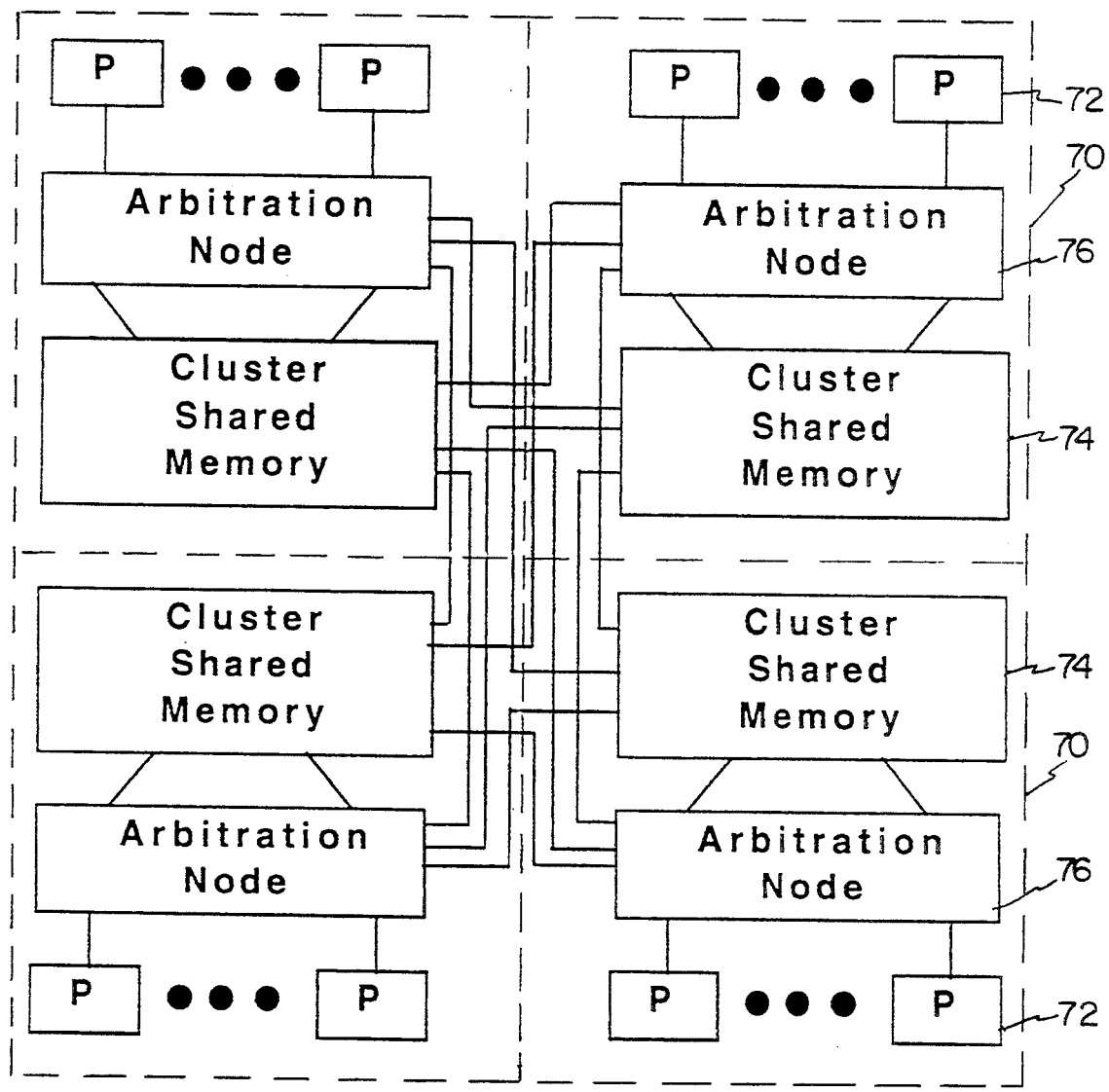

FIG. 2a shows the Thinking Machines, Inc., CM-1 supercomputer as an example of an extended shared memory system that uses a multi-stage switching network 30 to interconnect individual processors 32 that each have a local memory 34 such that all of the local memories 34 are interconnected together to form an extended shared memory. FIG. 2b shows the Kendall Square Research KSR-1 supercomputer as an example of an extended shared memory system that uses a plurality of segments 40 that are all connected together according to a hierarchical ring structure. Each segment 40 groups together the local memories 44 of a set of processors 42. The segments 40 are themselves grouped together by one or more higher domains 46 that operate only as information transfer processors. FIG. 2c shows the IBM RP3 parallel processing system as an example of a reconfigurable memory system that uses a control network 50 to selective configure the memory components 54 of each of thirty-two processors 52 as either local memory or global memory, or some combination thereof. FIG. 2d shows the University of Illinois Cedar supercomputer as an example of an extended shared memory system that directly connects all eight clusters 60 of processors 62 together via a global memory 64. Each cluster 60 includes eight processors 62 that are directly connected to a cluster shared memory 66, and also to the global memory 64. Finally, FIG. 2e shows the original supercomputer of the assignee of the present invention that directly connects all four clusters 70 together. Each cluster 70 includes sixteen processors 72 that symmetrically access a cluster shared memory 74 via a unique arbitration node network 76.

While different extended shared memory parallel processing architectures work well for different kinds of parallel programming problems, none has provided a generally workable solution for most kinds of parallel programming problems. In addition, each of these architectures is limited in the number of processors that can be effectively added to the parallel processing system. None of these architectures allows for an extendible number of processors to be connected to an extendible amount of memory in such a way so as to provide an extended shared memory model that is as close as possible to the ideal shared memory model.

Figure 3A:
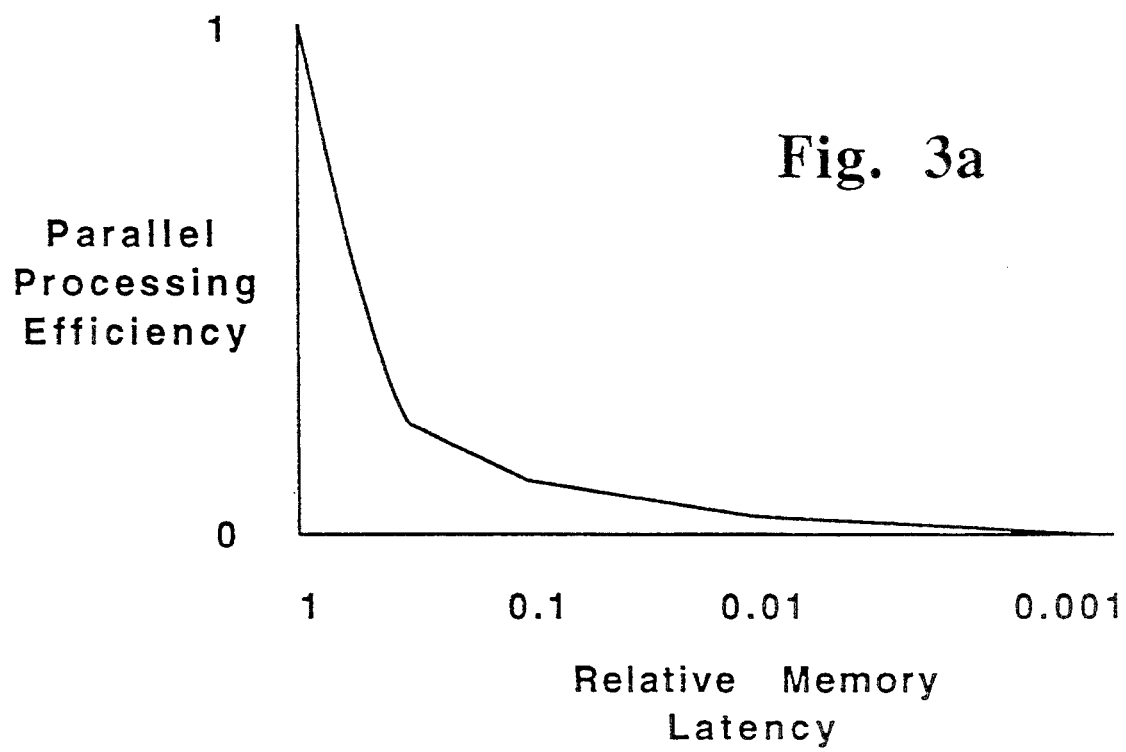
FIGS. 3a and 3b are graphs showing the relative memory latency and relative data locality of an extended shared memory system, respectively, as a function of parallel processing efficiency.
Figure 3B:
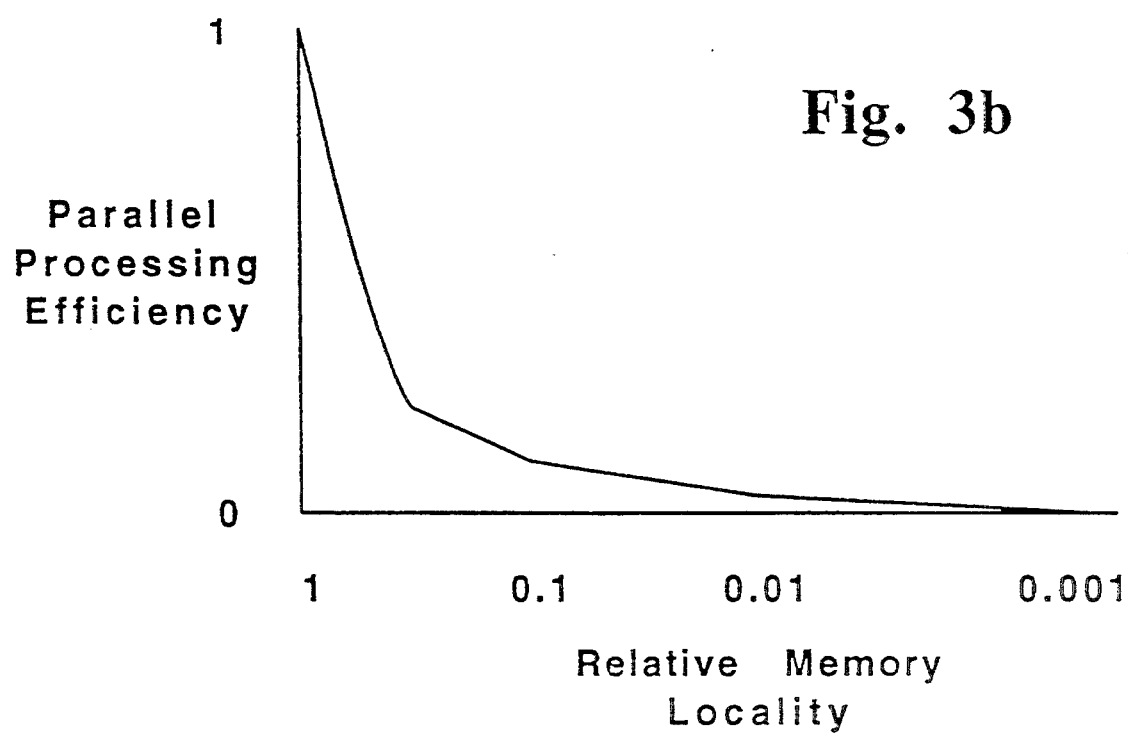

By analyzing the memory latencies and parallel processing efficiencies for a variety of extended shared memory systems, the inventors have found that optimum parallel processing performance for an extended shared memory model generally occurs under certain memory access conditions. Referring now to FIGS. 3a and 3b, the two most important of these conditions—relative memory latency and relative data locality—are shown as a function of parallel processing efficiency. It will be seen that the effect of relative memory latency, as shown in FIG. 3a, is such that the differences in memory latencies among the various memory portions of an extended shared memory must be relatively small, i.e., the slowest average memory access should be no more than about five to ten times that of the fastest memory access. Preferably, the slowest average memory access should only be about twice as slow as that of the fastest memory access. Similarly, it will be seen that the effect of relative data locality, as shown in FIG. 3b, is such that the relative number of memory accesses to any slower memory portions of the system must also be relatively small, i.e., the number of inter-cluster memory accesses should be less than about 10–12% of the number of intra-cluster memory accesses. In this context, an inter-cluster memory access is defined as any memory access where the average memory latency is greater than one. For optimum performance across an extended shared memory model, the number of inter-cluster memory accesses preferably should be about 1–5% of the total number of memory accesses for any given parallel programming task.

In order to provide a more effective memory model for a parallel processing system, the present invention utilizes a unique combination of the distributed memory model, the shared memory model and the extended shared memory model to form a unified parallel processing architecture. The preferred embodiment of the unified parallel processing architecture of the present invention will be described with reference to FIG. 4. Four clusters 100a, 100b, 100c and 100d together comprise a parallel processing computer system. Each cluster 100a includes two or more processors 102a that are symmetrically connected to a cluster shared memory 104a via a connection node 106a. Some, but not all, of the clusters 100a, 100b, 100c and 100d are adjacently interconnected.

Figure 4:
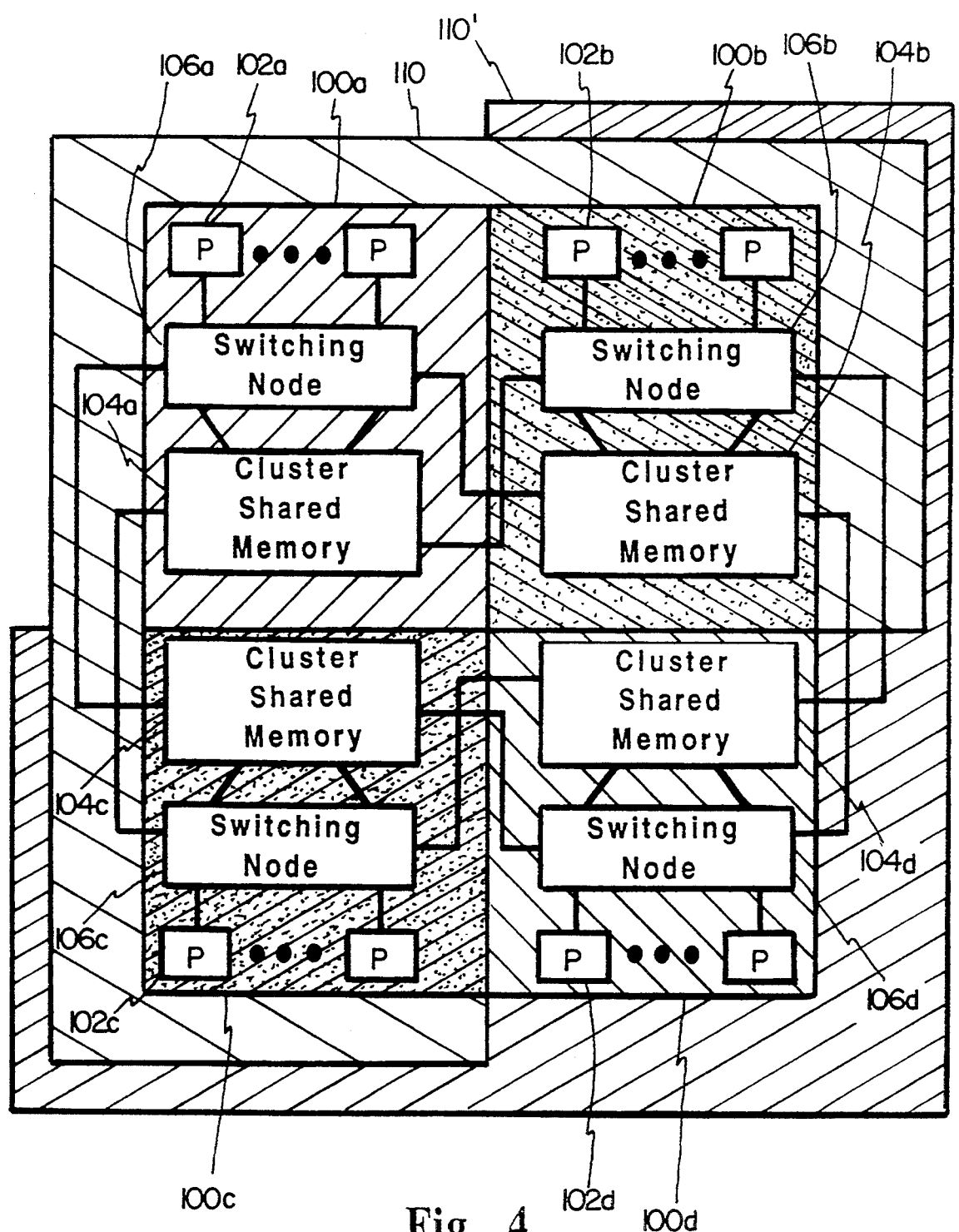
FIG. 4 is a simplified block diagram of the preferred embodiment of the unified parallel processing architecture of the present invention.

In the embodiment shown in FIG. 4, clusters 100a, 100b and 100c are adjacently connected together to form a first floating shared memory 110 and clusters 100b, 100c and 100d are adjacently connected together to form a second floating shared memory 110'. In the first floating shared memory 110, the processors 102a in cluster 100a can directly access the cluster shared memory 104a of cluster 100a, and can adjacently access the cluster shared memory 104b and 104c of clusters 100b and 100c, respectively. Similarly, for the second floating shared memory 110', the processors 102d in cluster 100d can directly access the cluster shared memory 104d of cluster 100d, and can adjacently access the cluster shared memory 104b and 104c of clusters 100b and 100c, respectively. However, the processors 102a of cluster 100a cannot directly or adjacently access the cluster shared memory 104d of cluster 100d. Likewise, the processors 102d of cluster 100d cannot directly or adjacently access the cluster shared memory 104a of cluster 100a. The only type of access between clusters 100a and 100d is some form of distributed memory communication mechanism that can accommodate a distributed memory model for parallel programming, as discussed in greater detail hereinafter.

Unlike the prior art parallel processing systems, the present invention combines all three type of memory models. A true shared memory model with symmetrical access to a common shared memory 104a is provided for all processors 102a in cluster 100a. An extended shared memory model is provided for all of the processors 102a, 102b and 102c that adjacently access the cluster shared memories 104a, 104b and 104c in the floating shared memory 110, for example. Finally, a distributed shared memory model is provided for all processors 102a that need to access the cluster shared memory 104d of a non-adjacently connected cluster 100d, for example. The only limitation on the unified memory model of the present invention is that the memory preferably should be homogeneous for both intra-cluster and inter-cluster memory accesses. For purposes of the present invention, homogenous memory is memory in which the storage format and access format are identical. While it would be possible to provide inter-cluster memory format translation mechanism as part of an adjacent cluster interconnection, the time and processing power required to implement such format transformations would significantly limit the adjacent interconnection architecture of the present invention in terms of relative memory latency.

In the preferred embodiment of the present invention, the various memory and processor components are selected so as to provide a high performance parallel processing computer system. The processors 102a, 102b, 102c and 102d are each comprised of a high performance scalar/vector processor having multiple memory ports and the cluster shared memory 104a, 104b, 104c and 104d is a high performance multiple section, multiple banks per section memory of the type shown and described in the previously identified co-pending application entitled CLUSTER ARCHITECTURE FOR A HIGHLY PARALLEL SCALAR/VECTOR MULTIPROCESSOR SYSTEM.

It will be recognized, however, that many different types of processors can be effectively utilized with the unified parallel processing architecture of the present invention. For example, it would be possible to build a parallel processing computer system in accordance with the present invention that utilized commercially single chip microprocessors, as well as commercially available memory chips. Alternatively, existing shared memory and extended shared memory multiprocessor systems might be retrofitted to take advantage of the unified parallel processing architecture of the present invention. Finally, it should be understood that there is nothing which would limit the present invention to connecting together only like kinds of processors. For example, it would be possible to populate one cluster with one kind of general-purpose processor, and populate a second cluster with a different kind of specialized processor that is better suited to perform signal processing, for example. Similarly, two different kinds of processors could be integrated as part of a single cluster that was then connected into a parallel processing computer system in accordance with the present invention.

In the preferred embodiment, the connection nodes 106a, 106b, 106c and 106d are preferably of the unique arbitration node type that is also shown and described in the same previously identified co-pending application. The unique arbitration nodes allow for direct and symmetrical access by all of the processors 102a to the cluster shared memory 104a in a single cluster 100a. It will be recognized, however, that other types of connection nodes, such as a direct connection network or a uniform multistage connection network, could be used equally well with the present invention. The only limitation on the connection nodes 106 of the present invention is they provide essentially direct and symmetrical access to the cluster shared memory 104a by all of the processors 102a within that cluster 100a. In other words, any intra-cluster memory accesses by the processors 102a to the cluster shared memory 104a via the connection nodes 106a will have relative memory latencies and relative memory localities of approximately unity.

Figure 5A:
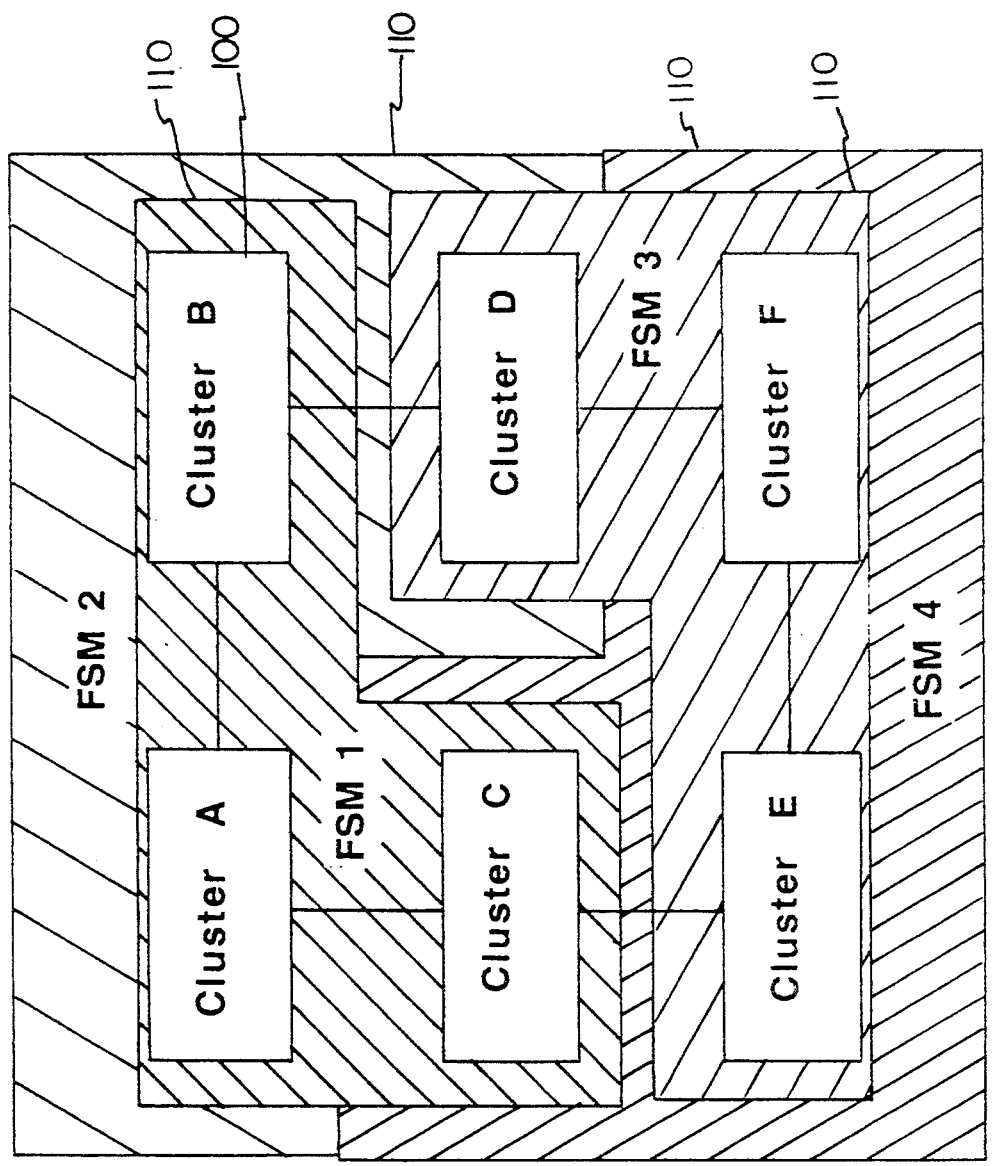
FIGS. 5a, 5b, 5c and 5d are block diagrams showing four different cluster connection topologies for adjacently connecting multiple clusters together in accordance with the present invention.
Figure 5C:
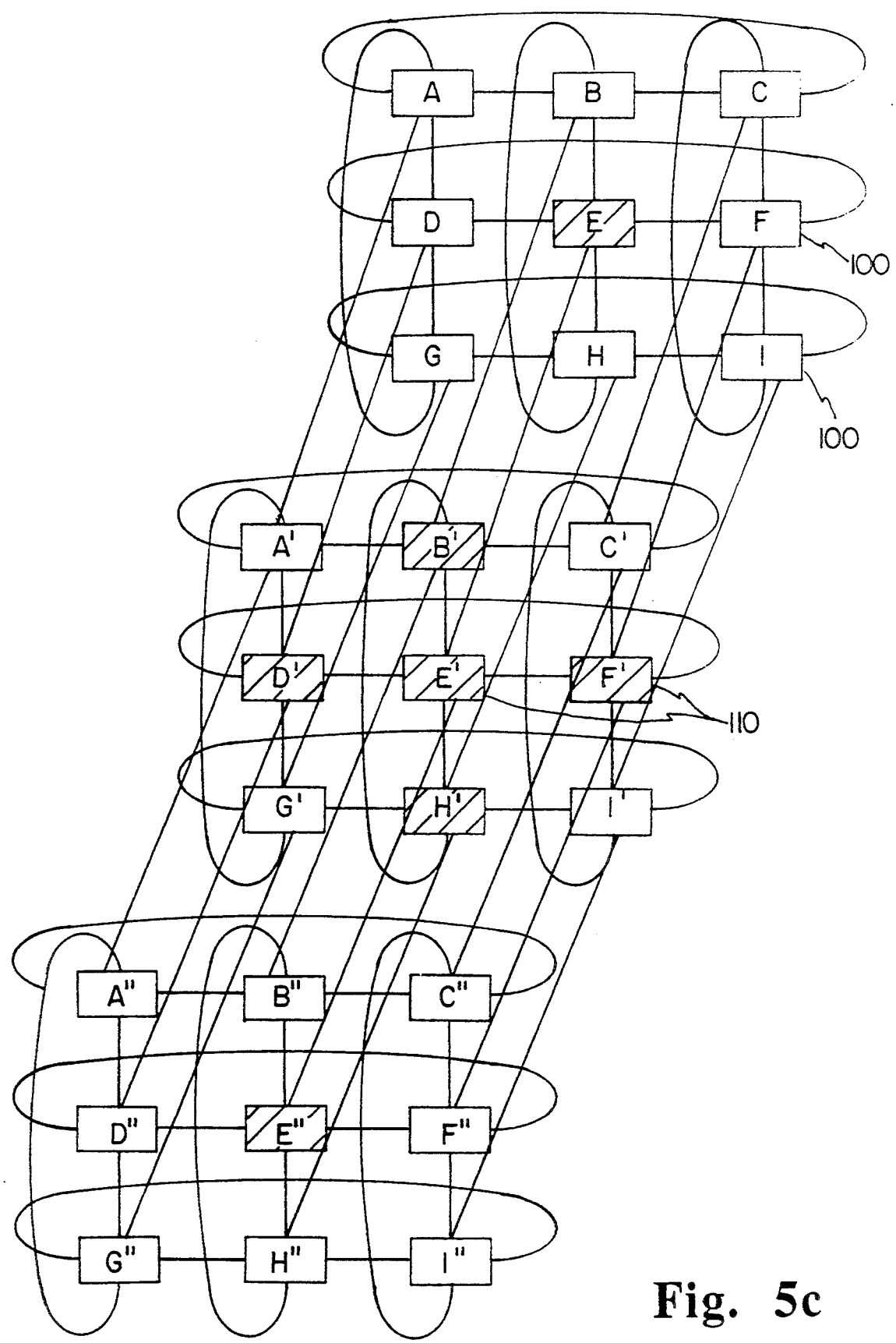
Figure 5B:
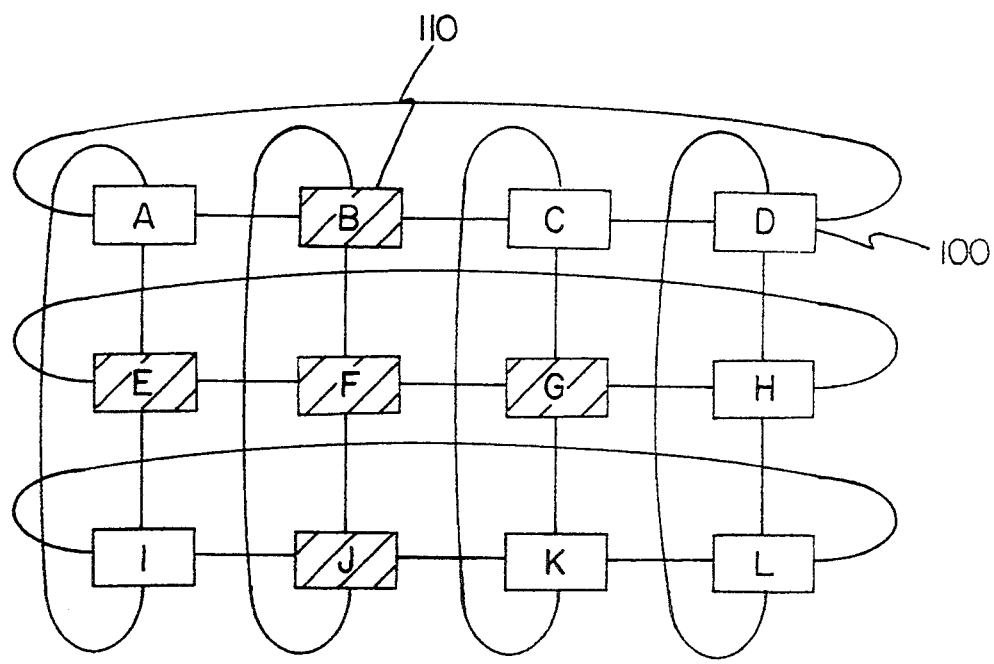
Figure 5D:
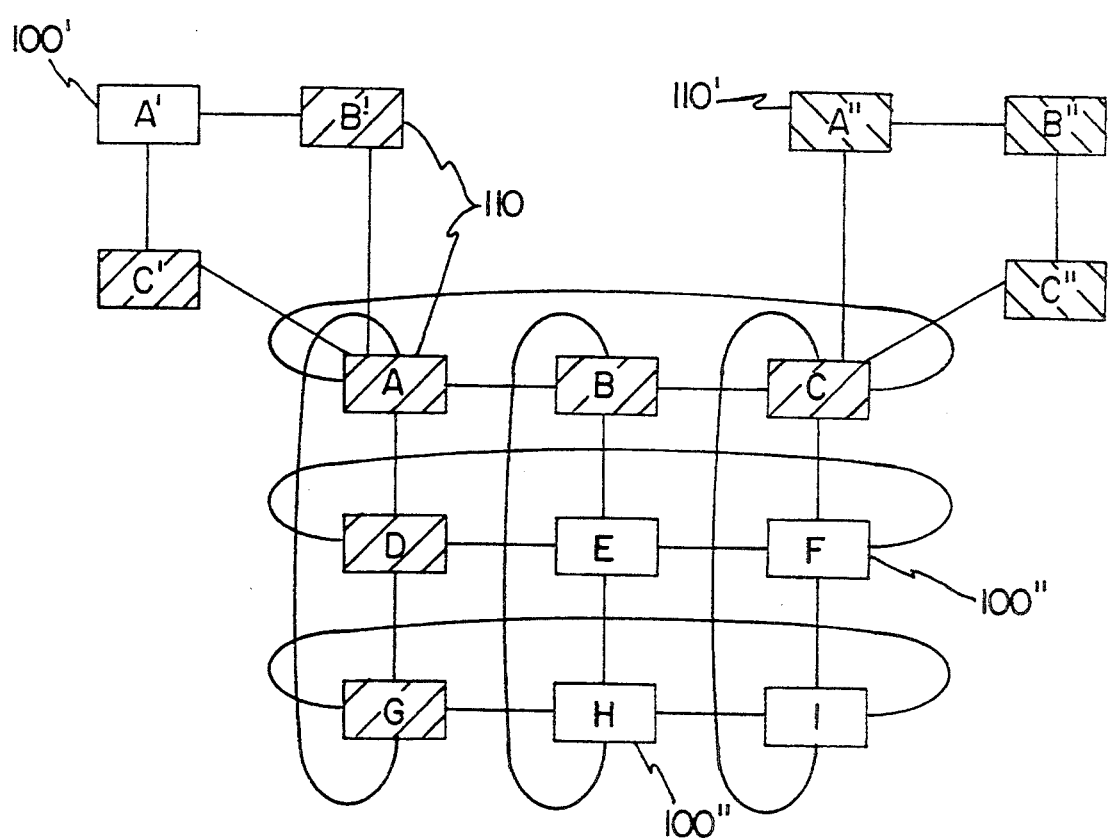

Referring now to FIGS. 5a–5d, four different cluster connection topologies are shown for adjacently connecting multiple clusters together in accordance with the present invention. In FIG. 5a, a single dimensional ring-type connection is shown wherein each of six clusters 100 (Cluster A–E) is adjacently connected to two other clusters, thereby forming four floating shared memories 110 (FSM1–FSM4), each floating shared memory having the total memory space of three cluster shared memories. In FIG. 5b, a two dimensional matrix-type connection is shown wherein each of twelve clusters 100 (A–L) is adjacently connect to four other clusters, thereby forming twelve floating shared memories 110. Only one of which is shown for ease of representation as shaded areas B, E, F, G and J. In this embodiment, each floating shared memory 110 has the total memory space of five cluster shared memories. In FIG. 5c, a three-dimensional cube-type connection is shown where each of twenty-seven clusters 100 (A–I, A'–I', and A''–I'') is adjacently connected to six other clusters (for ease of representation the connections between A and A'', for example, are not shown). In this arrangement, twenty-seven floating shared memories 110. Again, only one of which is shown for ease of representation as shaded areas E, B', D', E', F', H' and E''. In this embodiment, each floating shared memory 110 has the total memory space of seven cluster shared memories. Finally, in FIG. 5d, a non-uniform cluster connection is shown that has a pair of single dimensional ring-type connection for four of the clusters 100' with a two-dimensional matrix-type connection for six other clusters 100''. A first floating shared memory 110 centered on one of the corner clusters A is shown as shaded areas A, B, C, D, G, B', and C' and a second different size floating shared memory 110' is shown as shaded areas A'', B'' and C''.

It will be recognized that there are many ways in which the clusters 100 of the present invention can be adjacently interconnected, including both uniform and non-uniform connection. The key is that adjacent interconnections can be made only so long as the principals of extended shared memory regarding relative memory latency and relative data locality are implemented by the particular adjacent cluster interconnection topology. It should also be understood that although the preferred embodiment of the present invention is designed to provide a high performance parallel processing computer system, the unified parallel processing architecture of the present invention is equally applicable to any type of parallel processing computer system, regardless of the performance levels of the individual processors and memory components that make up such a system.

The objective of the present invention is to organize the processors and memory components of a parallel processing computer system in such a way as to provide a unified memory model that can be used to optimize the parallel processing efficiency of that system. In this regard, the graphs showing the relative memory latency and relative data locality for an average parallel processing task are useful in determining how best to organize the individual processor and memory components that make up such a system. In order to provide a common shared memory, there should be four or more groups of processors, each group having at least two or more of the processors with direct and symmetrical memory access to a common shared memory associated with that group of processors. An extended shared memory is provided by at least three of the groups of processors that are adjacently interconnected so as to define a floating shared memory having relative memory latency and relative data locality parameters within the constraints taught by the present invention. Finally, a distributed memory is provided by at least two of the groups of processors that are not adjacently interconnected. A distributed memory communication mechanism can be used to connect processors in any non-adjacent groups so as to provide multiprocessor interconnection without sacrificing performance in terms of relative memory latency and relative data locality.

In accordance with the teachings of the present invention, any two groups or clusters of multiprocessors can be adjacently interconnected, so long as the average memory latency of an inter-cluster memory access by a processor in one cluster to the cluster shared memory of another cluster is less about ten times greater than the average memory latency of an intra-cluster memory access by a processor to the cluster shared memory within that cluster. In addition, it is preferred that clusters be adjacently interconnected only when the average number of the inter-cluster memory accesses is less than about ten percent of the number of intra-cluster memory accesses for an average parallel task. For more optimum performance, clusters are adjacently interconnected only if the average memory latency of an inter-cluster memory access is less than five times greater than the average memory latency of an intra-cluster memory access and the average number of the inter-cluster memory accesses is less than five percent of the number of intra-cluster memory accesses for an average parallel task. The best parallel processing efficiencies will be achieved when clusters are adjacently interconnected only if the average memory latency of an inter-cluster access is less than about two times greater than the average memory latency of an intra-cluster access and the average number of the inter-cluster memory accesses is less than one percent of the number of intra-cluster memory accesses for an average parallel task.

Figure 6A:
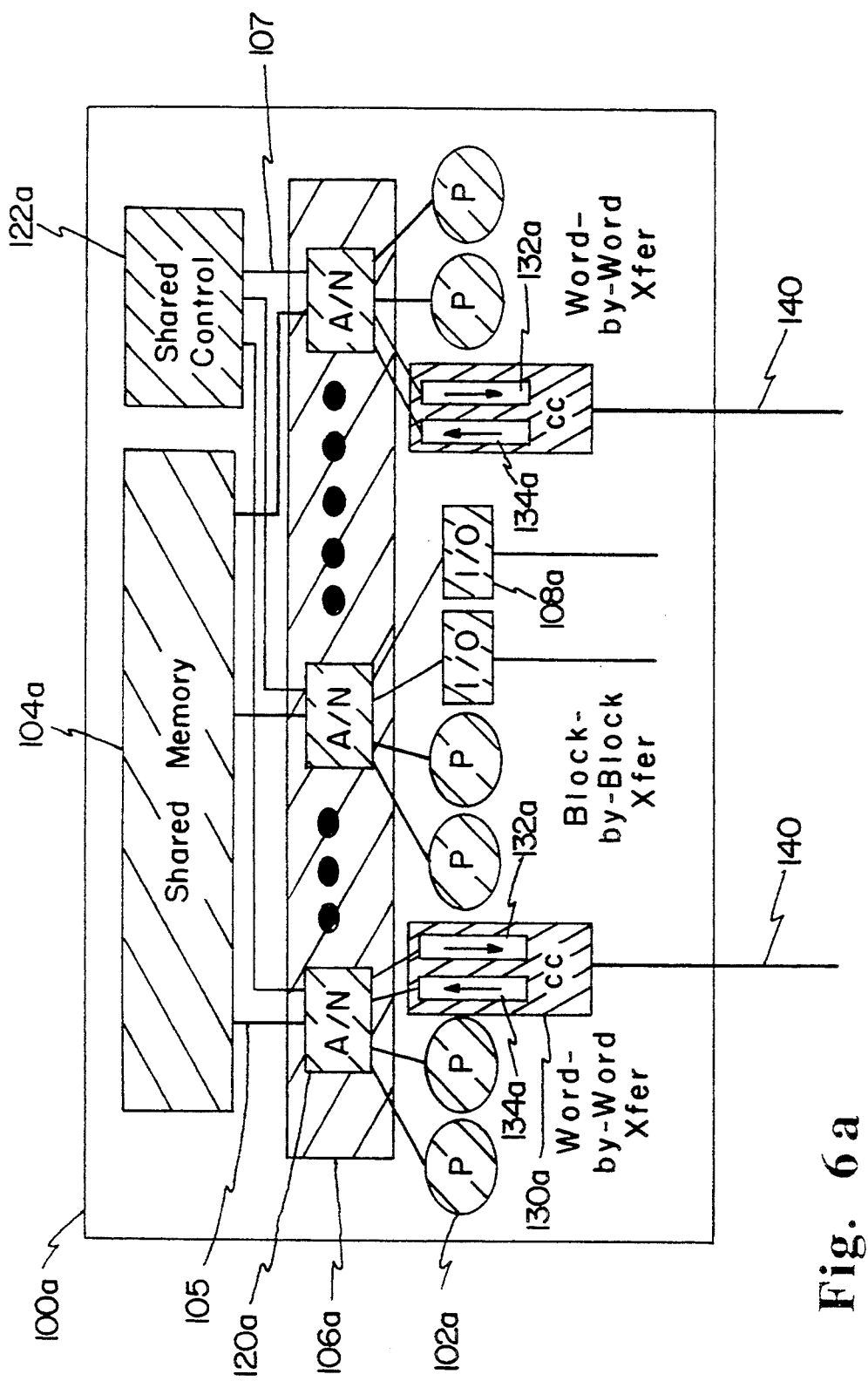
FIG. 6 is a more detailed block diagram of a single dimension ring-type cluster interconnection of the preferred embodiment of the present invention.
Figure 6B:
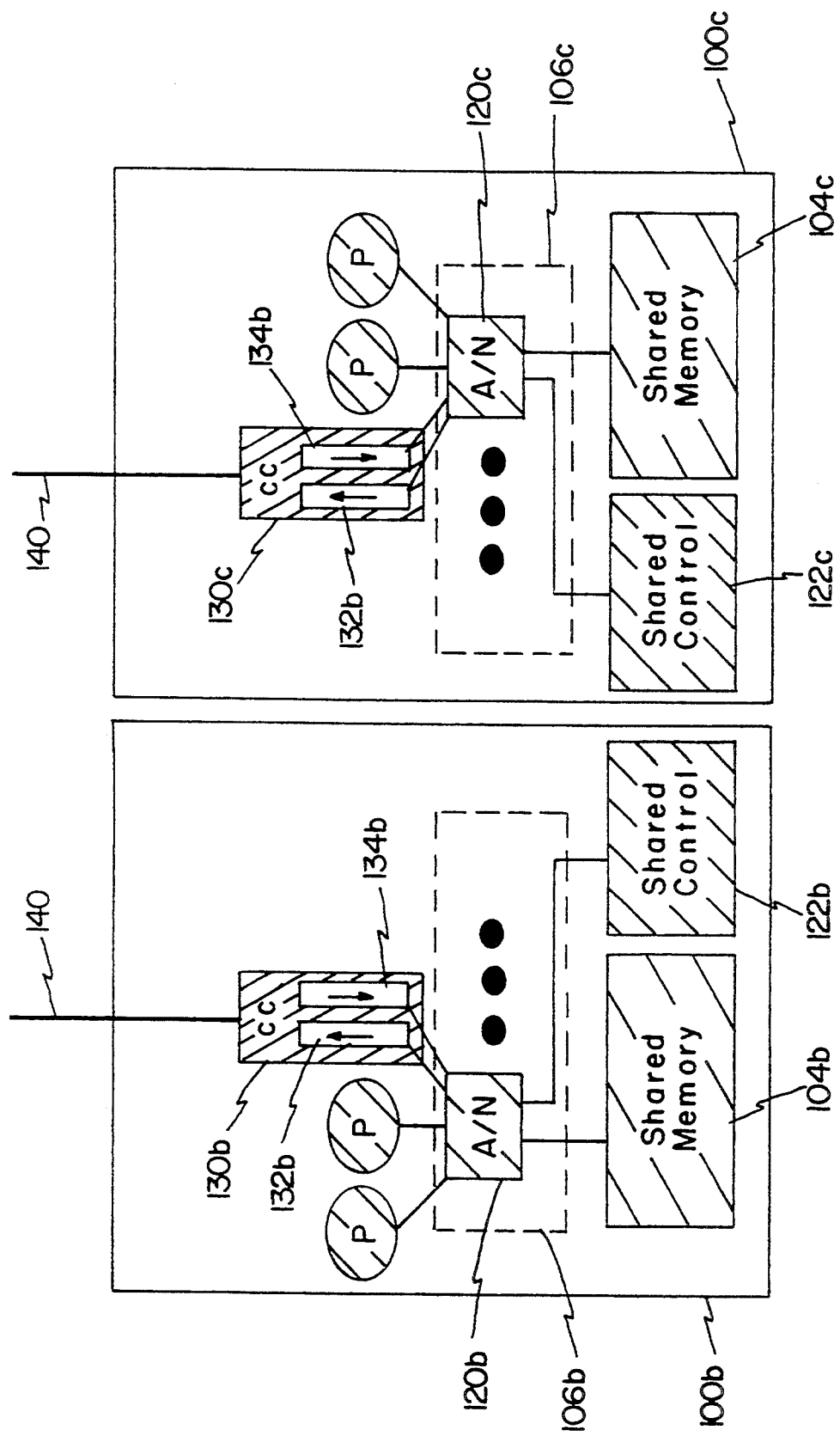

Referring now to FIG. 6, the preferred embodiment of the connection node 106 will be described. At a conceptual level, the connection node 106 comprises a plurality of cross bar switch mechanisms that symmetrically interconnect the processors 102 and one or more input/output ports 108 to the cluster shared memory 104 in the same cluster 100a. Typically, a full cross bar switch would allow each requestor to connect to each resource where there are an equivalent number of requestors and resources. In the preferred embodiment, the connection node 106 allows a result similar to a full cross bar switch to be achieved in the situation where there are more requestors than resources. There are a plurality of arbitration nodes 120 within the connection nodes 106 that provide for the direct and symmetrical access of the processors 102 to the cluster shared memory 104.

In the preferred embodiment, there are sixteen arbitration nodes 120 for each cluster 100 that can interconnect up to thirty-two processors 102 and up to twenty-eight input/output ports 108 with the shared cluster memory 104. Each arbitration node 120 is connected with the shared cluster memory 104 by eight pairs of unidirectional parallel paths 105. A single parallel pair of unidirectional paths 107 connects each arbitration node 120 with a shared control mechanism 122 that includes a set of global registers (not shown) and an interrupt mechanism (also not shown) for this cluster 100. The paths 105 and 107 each include a fetch data path and a store data path with error correcting codes, and control and address signals with parity bits. All of the paths 105 and 107 are capable of requesting transfers at the rate of one data word each clock cycle. In the preferred embodiment, all paths 105 and 107 are comprised of two electrical connections capable of supporting a differential signal for each bit of information. The specific operation of the arbitration nodes 120 is described in greater detail in the previously identified co-pending application entitled CLUSTER ARCHI-

TECTURE FOR A HIGHLY PARALLEL SCALAR/VECTOR MULTIPROCESSOR.

Unlike the original supercomputer developed by the assignee of the present invention which used a unique remote cluster access mechanism separate from the arbitration nodes 120 to directly connect each cluster to every other cluster, some of the arbitration nodes 120 also provide for a cluster connection mechanism 130 that is used to accomplish adjacent cluster connections. In the preferred embodiment, the processors 102a of cluster 100a are adjacently connected to the cluster shared memory 104b and 104c through two separate cluster connection output ports 132a in the connection node 106a. In cluster 100b, the inter-cluster memory accesses are received from the adjacently connected cluster 100a through a cluster connection input port 134b connected to the connection node 106b. Thus, it can be seen that the preferred embodiment of the cluster connection mechanism 120 between any adjacent pair of clusters 100 will comprise two separate pairs of cluster connection ports 132 and 134, one pair for inter-cluster memory accesses in each direction.

In accordance with the parameters for inter-cluster relative memory latency and relative data locality, the pair of cluster connection ports 132 and 134 are each unidirectional word-by-word communication paths that enable an inter-cluster memory access to be accomplished as quickly as possible. Any inter-cluster memory access to an adjacent cluster via the cluster connection ports 132 and 134 allows a processor 102a in cluster 100a, for example, to directly operate on the data stored in the cluster shared memories 104b and 104c as part of a single address space formed by an extended shared memory model that is created by the floating shared memory 110.

In the preferred embodiment, inter-cluster memory accesses from any of the processors 102a in cluster are automatically routed by the arbitration node 120a to a common inter-cluster dispatch circuit (not shown) that is logically part of the connection node 106a. From there, the inter-cluster memory accesses are routed to the appropriate cluster connection output port 132a, depending upon the memory address associated with the inter-cluster memory access. When the inter-cluster memory access is received by the cluster connection input port 134b in the adjacent cluster 100b, it is routed through the corresponding arbitration node 120b the clustered shared memory 104b. Once the inter-cluster memory access is serviced by the appropriate memory bank in the cluster shared memory 104b, it is returned to the common inter-cluster dispatch circuit within the connection node 106b. From there, the results of the inter-cluster memory accesses are routed to the appropriate cluster connection output port 132b, this time using a tag associated with the memory access that identifies the particular cluster 100 associated with this inter-cluster memory access. Upon receiving the results of the inter-cluster memory access through the cluster connection input port 134a, the common inter-cluster dispatch circuit determines which memory port from which arbitration node 120 issued the particular inter-cluster memory access and the results are now returned to that memory port. In the preferred embodiment, the common inter-cluster dispatch circuit is also part of the cluster shared control mechanism 122 as discussed in greater detail hereinafter. For a more detailed description of one method for routing the inter-cluster memory accesses by the common inter-cluster dispatch circuit, reference is made to the previously identified co-pending application entitled CLUSTER ARCHITECTURE FOR A HIGHLY PARALLEL SCALAR/VECTOR MULTIPROCESSOR SYSTEM.

In the preferred embodiment for a high performance parallel processing computer system, the clock speed of the processors 102 and the physical arrangement of the clusters 100 is such that an inter-cluster memory access can be serviced on every other clock cycle, as compared to servicing an intra-cluster memory access every clock cycle. This is done in order to allow for longer set up and latching times on transfers across the inter-cluster communication paths 140. As with the intra-cluster paths 105 and 107, differential signals are also used on the inter-cluster communication paths 140 to reduce electrical noise, transients and interference that may occur due to the high clock speeds and close physical proximity of these paths in the preferred embodiment. By providing for an inter-cluster memory access every other clock cycle, the relative memory latency for inter-cluster memory accesses in the preferred embodiment is between approximately 0.1 and 0.5, depending upon the level of system activity in each cluster.

In the preferred embodiment, there are eight separate memory ports (not shown) per processor 102 that can each issue a memory access per clock cycle, but there are only two cluster connection output ports 132 per connection node 106. Thus, the relative data locality for an inter-cluster memory access for any given processor 102 in the preferred embodiment is between approximately 0.02 and 0.25, depending upon the level of system activity and the nature of the inter-cluster memory accesses. In the event that the relative data locality for an inter-cluster memory access is measured only with respect to one other cluster, then the relative data locality is between approximately 0.01 and 0.125, again depending upon the level of system activity and the nature of the inter-cluster memory accesses.

Referring now to Tables I, II and III, the particular stages and phases of an inter-cluster memory access of the preferred embodiment will be described in detail. In the preferred embodiment, there are three stages to an inter-cluster memory access. Stage I covers the time period from when a memory access is issued by a processor 102 until the memory request reaches the cluster connection input port 134 of the adjacent cluster 100 to which it is directed, as shown in Table I. Stage II covers the time period in the adjacent cluster 100 from when the memory access is received at the cluster connection input port 134 until the response to the memory access is presented at the cluster connection output port 132, as shown in Table II. It will be recognized that Stage II is essentially similar to the relative memory latency for an intra-cluster memory access. Finally, Stage III covers the time period back in the issuing cluster 100 from when the memory access is received at the cluster connection input port 134 until it is returned to the processor 102, as shown in Table III. In the preferred embodiment, each stage of an inter-cluster memory access will consist of multiple phases. Each phase must be completed in succession. Conflicts at any given phase are not evaluated until the inter-cluster memory access has passed all conflicts in any previous phase.

Referring to Table I, Phase I-1 is the issuance of a memory reference by a port in the processor 102 to the arbitration node. Associated with this phase is a constant pipeline latency of N1 clock cycles. Also associated with this phase is a variable delay of V1 clock cycles. V1 is determined as a function of Simultaneous Section Conflict (SSC) and Catch Queue Full (CQF) conflicts. A SSC occurs when two or more ports sharing the same arbitration node request an inter-cluster memory access on the same clock cycle. A CQF occurs when the number of outstanding inter-cluster memory accesses from a given arbitration node exceeds a predetermined maximum number of pipeline stages involved in an inter-cluster memory access.

Phase I-2 is the issuance of the inter-cluster memory access from the arbitration node to the common dispatch circuit. Associated with this phase is a constant pipeline latency of N2 clock cycles and a variable delay of V2 clock cycles. V2 is a function of Simultaneous Bank Conflict (SBC), Bank Busy Conflict (BBC) and Hold Queue Full (HCQ) conflicts. A SBC conflict occurs when two or more inter-cluster memory accesses from different arbitration nodes attempt to access the same adjacent cluster on the same clock cycle. This is a one cycle conflict that then turns into a BBC conflict. A BBC conflict occurs when a memory reference addresses an adjacent cluster that is currently busy due to a previous reference. A HQF conflict occurs when the number of outstanding memory references from a given arbitration node to any given adjacent cluster exceeds a predetermined maximum number of pipeline stages involved in an inter-cluster memory access.

Phase I-3 of an inter-cluster memory access is the progress of the memory access from the common dispatch circuit to the appropriate cluster connection output port 132. Associated with this phase is a constant pipeline latency of N3 clock cycles. Finally, Phase I-4 is the progress of the memory access from the cluster connection output port 132 across the cable. Associated with this phase is a constant cable delay of N4 clock cycles.

Referring now to Table II, the progress of the inter-cluster memory access through the adjacent cluster 100 will be described. Phase II-1 is the receiving of the inter-cluster memory access by the cluster connection input port 134 and arbitration of that memory access as one of the multiple ports accessing an arbitration node in the adjacent cluster. Associated with this phase is a constant pipeline latency of M1 clock cycles. Also associated with this phase is a variable delay of W1 clock cycles. W1 is determined as a function of Simultaneous Section Conflict (SSC) and Catch Queue Full (CQF) conflicts. A SSC occurs when two or more ports sharing the same arbitration node request the same memory section of the clustered shared memory 104 of the adjacent cluster on the same dock cycle. A CQF occurs when the number of outstanding memory accesses from a given arbitration node to a given subsection of the cluster shared memory exceeds the maximum number of pipeline stages in the catch queue used to queue these memory accesses on the input side of the memory bank addressed by the memory access.

Phase II-2 is the issuance of an inter-cluster memory access is at the bank level of the cluster shared memory 104 in the adjacent cluster. Associated with this phase is a constant pipeline latency of M2 clock cycles and a variable delay of W2 clock cycles. W2 is determined by a bank arbitration network (not shown) and is a function of Simultaneous Bank Conflict (SBC), Bank Busy Conflict (BBC) and Hold Queue Full (HCQ) conflicts. A SBC conflict occurs when two or more memory accesses from different arbitration nodes attempt to access the same bank on the same clock cycle. This is a one cycle conflict that then turns into a BBC conflict. A BBC conflict occurs when a memory reference addresses a bank 208 that is currently busy due to a previous reference and is a function of the SRAM technology used in the memory banks in the preferred embodiment. A HQF conflict occurs when the number of outstanding memory references from a given arbitration node to any given subsection exceeds the maximum number of pipeline stages in a hold queue to queue the response to the accesses on the output side of the memory bank of the cluster shared memory 104 of the adjacent cluster.

Phase II-3 of a memory reference is the progress of the memory reference through the memory bank. Associated with this phase is a constant delay of M3 clock cycles corresponding to the access time of the SRAMs in the preferred embodiment of the memory banks of the cluster shared memory 104.

Phase II-4 is the issuance of the load return data back to the requesting arbitration node in the adjacent cluster. Associated with this phase is a constant pipeline delay of M4 clocks and a variable delay of W4 clocks. W4 is determined by the memory as a function of Simultaneous Return Conflict (SRC) and Data Queue Full (DQF) conflicts. A SRC conflict occurs when two or more memory access from a given arbitration node are sent to the same memory section, but different subsections are attempting to return words on the same clock cycle. This conflict occurs because of bank conflicts and subsequent skewing of the memory accesses and is resolved by a response arbitration network (not shown). This conflict also occurs if these memory accesses are issued at their respective banks on different cycles and delay due to DQF conflicts cause a time realignment such that the Memory References attempt to use the same load data return path on the same clock cycle. A DQF conflict occurs when the number of outstanding memory accesses from a given arbitration node to a given memory section exceeds the maximum number of pipeline stages in a data queue to queue those returning references at the arbitration node.

Phase II-5 of a memory reference is the return of words of data to the requesting port in the arbitration node 44. Associated with this phase is a constant delay of M5 clock cycles and a variable delay of W5 clock cycles. W5 is determined by the response arbitration network as a function of any Port Busy Conflict (PBC) conflicts. A PBC conflict occurs when two or more Memory References from different memory sections attempt to return to the same port on the same clock cycle. At this point, the response to the inter-cluster memory access is now in the cluster connection output port 134 of the adjacent cluster 100 and is ready to be returned to the requesting cluster.

Referring now to Table III, the progress of the inter-cluster memory access as it is returned to the requesting cluster 100 and finally to the requesting processor 102 will be described. Phase III-1 is the progress of the memory access from the cluster connection output port 132 of the adjacent cluster 100 back across the cable. Associated with this phase is a constant cable delay of N4 clock cycles. Phase III-2 of an inter-cluster memory access is the progress of the memory access from the cluster connection input port 132 of the requesting cluster 100 to the common dispatch circuit. Associated with this phase is a constant pipeline latency of N3 clock cycles.

Phase III-3 is the issuance of the load return data from the common dispatch circuit back to the requesting arbitration node. Associated with this phase is a constant pipeline delay of N5 clocks and a variable delay of V5 clocks. V5 is determined by the memory as a function of a Simultaneous Return Conflict (SRC) and Data Queue Full (DQF) conflicts. A SRC conflict occurs when two or more inter-cluster memory accesses from a given arbitration node are sent to the same adjacent cluster. This conflict occurs because of section and bank conflicts in the cluster shared memory of the adjacent cluster and the subsequent skewing of the inter-cluster memory accesses and is resolved by the response arbitration network. This conflict also occurs if these inter-cluster memory accesses are issued at their respective adjacent clusters on different cycles and delay due to DQF conflicts cause a time realignment such that the inter-cluster memory accesses attempt to use the same load data return path on the same clock cycle. A DQF conflict occurs when the number of outstanding Inter-cluster memory accesses from a given arbitration node to a given adjacent cluster exceeds the maximum number of pipeline stages involved in an inter-cluster access.

Finally, Phase III-4 of a memory reference is the return of words of data to the requesting port of the processor 102 in the arbitration node. Associated with this phase is a constant delay of N6 clock cycles and a variable delay of V6 clock cycles. V6 is determined by the response arbitration network as a function of any Port Busy Conflict (PBC) conflicts. A PBC conflict occurs when two or more inter-cluster memory accesses from different adjacent clusters attempt to return to the same port on the same clock cycle.

TABLE I

Memory Latency of Inter-Cluster Memory Accesses Within the Requesting Cluster as Memory Access is Sent

| PHASE TYPE | PHASE I-1 PORT to ARB NODE | PHASE I-2 ARB NODE to DISPATC | PHASE I-3 DISPATC to OUTPUT | PHASE I-4 OUTPUT to INPUT |
|---|---|---|---|---|
| DELAY | N1 + V1 | N2 + V2 | N3 | N4 |
| CONFLICT | SSC CQF | SBC BBC HQC | none | none |

TABLE II

Memory Latency of Inter-Cluster Memory Accesses Within the Adjacent Cluster

| PHASE TYPE | PHASE II-1 PORT to ARB NODE | PHASE II-2 ARB NODE to BANK | PHASE II-3 MEMORY | PHASE II-4 BANK to ARB NODE | PHASE II-5 ARBNODE to PORT |
|---|---|---|---|---|---|
| DELAY | M1 + W1 | M2 + W2 | M3 | M4 + W4 | M5 + W5 |
| CONFLICT | SSC CQF | SBC BBC HQC | none | SRC DQF | PBC |

TABLE III

Memory Latency of Inter-Cluster Memory Accesses Within the Requesting Cluster as Memory Access is Returned

| PHASE | PHASE III-1 | PHASE III-2 | PHASE III-3 | PHASE III-4 |
|---|---|---|---|---|
| TYPE | OUTPUT to INPUT | INPUT to DISPATC | DISPATC to ARB ND | ARB NODE to PORT |
| DELAY | N4 | N3 | N5 + V5 | N6 + V6 |
| CONFLICT | SSC CQF | SBC BBC HQC | none | none |

It will be noted with reference to FIG. 6, that, in the preferred embodiment, the two cluster connection ports 132 and 134 are effectively connected to an arbitration node 120 in place of a pair of input/output ports 108. In this way, either an input/output port 108 or a cluster connection mechanism 130 can be interchangeably connected to an arbitration node 120. Accordingly, although the total number of pairs of input/output ports 108 and cluster connection mechanisms 130 is fixed at sixteen per cluster, the ratio of pairs of input/output ports 108 to cluster connection mechanisms 130 is configurable. This configurability allows a parallel processing computer system to be configured in a way best suited for the particular user environment, as well as the types of parallel programming tasks performed by the parallel processing computer system. For those situations where there are extensive input/output operations involved as part of the parallel processing, more input/output ports 108 may be desirable. Conversely, where the sizes of the problem space for the computer programs are generally larger than the size of a single cluster shared memory 104, it may be desirable to increase the number of cluster connection mechanisms 130.

It will be further recognized that there is nothing in the present invention which would prevent doubling or even tripling up on the number of connection mechanisms 130 communicating between a pair of adjacently connected clusters 100. For example, by replacing an additional pair of input/output ports 130, a second cluster connection mechanism 130 could be installed between clusters 100a and 100b, thereby doubling the effective memory access bandwidth between these two clusters. In the event that more than one cluster connection mechanism 130 is utilized between adjacent clusters, it should be understood that the parallel processing computer system must either be able to serialize all inter-cluster memory accesses, or, more preferably, tolerate non-sequential memory accesses in the manner taught, for example, by the previously referenced co-pending application entitled METHOD AND APPARATUS FOR NON-SEQUENTIAL RESOURCE ACCESS.

Still referring to FIG. 6, the extendible control mechanism of the preferred embodiment of the present invention will now be described. In the preferred embodiment of the present invention, a common shared control mechanism 122 is part of each cluster 100. The shared control mechanism 122 includes a plurality of global registers and an interrupt mechanism that are utilized by a distributively-based operating system to coordinate and communicate among processes executing in parallel in the parallel processing computer system.

The operating system of the preferred embodiment distributively implements an anarchy-based scheduling model for the scheduling of processes and resources by allowing each processor 102 to access a single image of the operating system stored in the cluster shared memory 104 that operates on a common set of operating system shared resources, many of which are stored in the global registers of the shared control mechanism 122. Work request queues which form a part of the operating system shared resources allow processes to either post work requests, or examine other work requests, both within the same process image that a processor is currently executing, or in another process image. In addition, lightweight user and system context switches are also efficiently supported by the operating system program, as well as by a unique user-side scheduler that is integrated as part of the user's application program.

In addition to the operating system program executing in each of the clusters 100, the preferred embodiment of the present invention includes a common parallel user interface that provides for compiler, execution and debugger support. The compiler of the preferred embodiment operates to expose any parallelism in the user program at any level and to map the identified parallelism in the user program to the hardware capabilities of the particular parallel processing computer system. This could include working with parallelism from vectorization and scheduling of multiple functional units within a single processor, to providing for virtual array support by inserting code to organize the mapping of the segments of the program into the cluster shared memories of the parallel processing computer system. Ideally, the compiler, in conjunction with appropriate data parallel programming constructs in the user program, can determine how best to map the user's program to the parallel processing capabilities of the particular unified parallel processing computer system in accordance with the present invention.

In order to provide for effective control and debugging of parallel processes, the interrupt mechanism of the preferred embodiment enables all of the processors within adjacent clusters that are working on the same parallel processing task to be interrupted within a bounded number of clock cycles. This preserves the state of the parallel processing task at the time of any fault or exception and greatly simplifies the debugging of any such errors.

For a more detailed description of the preferred embodiment of the shared control mechanism 122, reference is made to the previously identified co-pending applications entitled GLOBAL REGISTERS FOR A MULTIPROCESSOR SYSTEM and FAST INTERRUPT MECHANISM FOR A MULTIPROCESSOR SYSTEM. For a more detailed description of how the distributively-based operating system of the preferred embodiment utilizes the shared control mechanism to control parallel execution of processes across clusters, reference is made to the previously identified copending application entitled INTEGRATED SOFTWARE ARCHITECTURE FOR A HIGHLY PARALLEL MULTIPROCESSOR SYSTEM.

The distributively-based operating system program described above can operate in either the shared memory model of a single cluster 100, or the extended shared memory model of a floating shared memory 110. To operate a parallel processing program beyond the bounds of a floating shared memory 110, the present invention provides for a distributed communication mechanism to coordinate and communicate among parallel processes in a distributed memory model. In the preferred embodiment, the distributed communication mechanism is a part of the operating system program executing in each cluster 100 and includes two different inter-cluster communication schemes for communicating among non-adjacent clusters—a message passing scheme and a floating scheme. In addition, both of these communication schemes can be implemented either through neighbor-to-neighbor inter-cluster transfers, or through a common input/output device, such as a secondary memory storage system, that is capable of supporting a virtual array, for example.

The message passing scheme for the distributed communication mechanism is implemented in each operating system program executing in one or more processors of each cluster 100 such that messages may be passed among the processors in all of the clusters 100 in the parallel processing computer system. If the messages are to be passed via neighbor-to-neighbor inter-cluster transfers, the operating system program in each cluster could periodically monitor one of the global registers in an adjacent cluster, for example, to determine if a message of a predetermined format has been left, either in the cluster shared memory of the adjacent cluster, or perhaps even in another global register of the adjacent cluster. Once a message was detected, the operating system program would initiate execution of an interrupt procedure in one of the processors in that cluster to transfer the message to the cluster shared memory of the appropriate adjacent cluster or clusters so as to forward the message, or would read the message and act on it if the message was intended for a process executing within that cluster. Alternatively, an interrupt could be sent from one cluster to one or more adjacent clusters to alert the operating system program in an adjacent cluster that a message was waiting to be transferred.

For larger messages, it may be advantageous to utilize the larger input/output bandwidth of the preferred embodiment to transfer the message to a common input/output device and then alert the operating system program in the target cluster that a message was waiting to be received at a certain location in the common input/output device. It will be recognized that, because the input/output ports of the present invention operate on a block-by-block transfer, the size of the message must be sufficient to not only cover the slower device speed of the input/output device, but also any overhead necessary to setup the block transfer to the input/output device. It will also be understood that the same type of mail-box messaging implemented using the global registers and cluster shared memory could also be implemented using a common input/output device; however, the overall parallel processing performance for this type of a message passing scheme will be much lower for most parallel processing tasks.

A second option for the distributed communication mechanism is a floating scheme implemented in an operating system program executing in one or more of the processors in each cluster. Under a floating scheme, the operating system program will select one or more segments of data or instructions for a parallel task that are to be moved from the floating shared memory of one set of adjacently interconnected clusters to the floating shared memory of another set of adjacently interconnected clusters. Most typically, the floating scheme would be used when the operating system program determines that a parallel processing task executing in this cluster is making a significant number of data memory accesses to the cluster shared memory of a non-adjacently connected cluster, or even to the cluster shared memory of an adjacently connected cluster if the number of inter-cluster memory accesses by the particular parallel processing task is taxing the boundaries of the relative data locality of the particular embodiment of the unified parallel processing architecture of the present invention. In this case, the operating system program decides that to increase the parallel processing efficiency, the instructions for the particular parallel processing task should be moved or "floated" to the cluster shared memory of the cluster to which the majority of the inter-cluster memory accesses are directed. As with the message passing scheme, the floating scheme can be implemented either through a series of cluster-to-cluster transfers, or via an input/output transfer to a common storage device.

Figure 7:
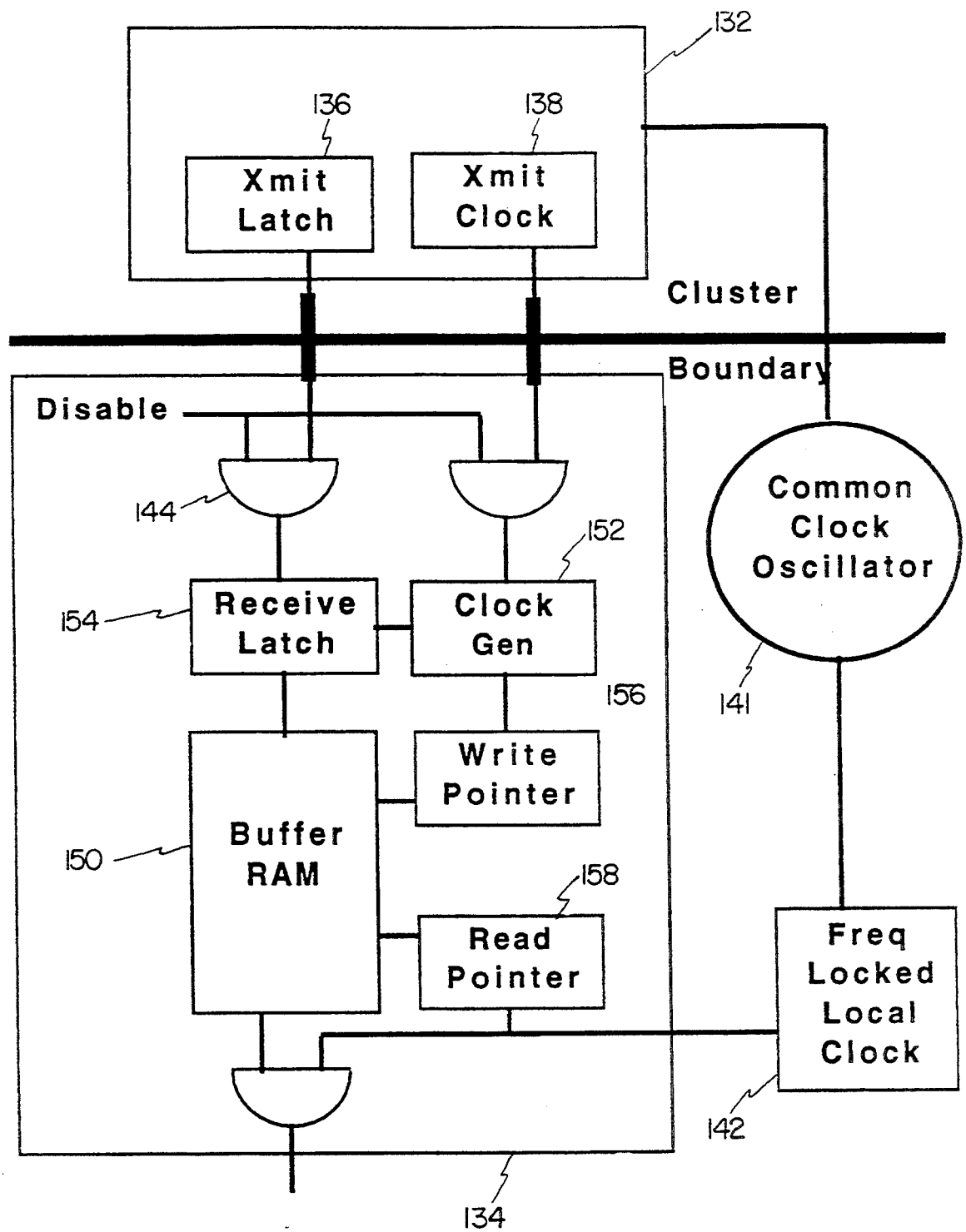
FIG. 7 is a schematic diagram of the preferred embodiment of the adjacent cluster connection mechanism of the present invention, including the circuitry for implementing the extendible clock mechanism.

Referring now to FIG. 7, the detailed implementation of the cluster connection mechanism 130 will be described. The preferred embodiment of the cluster connection mechanism 130 is specifically designed to overcome the physical limitations involved in transferring data and clock signals to physically separable components of a parallel processing computer system. This design overcomes the limitations of the prior art parallel processing computer systems, and allows for an extendible number of clusters 100 to be interconnected in accordance with the uniform parallel processing architecture of the present invention.

Most prior art parallel processing computer systems use a centrally located clock source to provide synchronous clock signals to every component in the computer system. Unfortunately, there are very real physical limits as to the number of physically separable components which can be provided with synchronous clock signals. Differences in cables, receivers, and signal transmission media characteristics, including cable shielding and stray EMF signals, and in the power supplies for each physically separable component, can yield effectively different clock phases, as well as different duty cycles, in the clock signal received at each such component. For example, if the clock receivers in two separate components are set to trigger at slightly different threshold levels, the resulting clock signals in each component will have significantly different duty cycles.

These "differences" in the clock signal between clusters 100 can negatively affect the tolerance performance of the various electronic circuits that are clocked by that clock signal, thereby causing spurious errors, and possibly inconsistent results between physically separable components. It will be recognized that these "differences" in the clock signals become increasingly more problematic as the clock speed of the parallel processing computer system is increased. In those parallel processing computer systems where the clusters or other devices are separated by communication paths having transmission uncertainties that are longer than one clock cycle, (e.g., a clock speed of 5 nanoseconds and an inter-cabinet distance of greater than 20 feet) it can be impossible to provide for reliable synchronous inter-device communication.

In order to solve the various physical limitations associated with providing clock signals and inter-device communication in a high performance parallel processing computer system, the preferred embodiment of the present invention utilizes a phase-independent clock communication scheme between clusters 100 that is frequency locked, but is not phase locked. As shown in FIG. 7, each cluster 100 receives a common, frequency locked only clock signal 141 that is used to build a local clock signal 142. The phase-independent clock communication scheme of the present invention uses only the leading edge of the clock signal 141 to trigger the local clock signal 142. This overcomes the problem of varying duty cycles described above. In addition to a frequency locked, phase-independent local clock 142 in each cluster 100, as part of the cluster communication input port 134, a parallel buffer 150 is used to accommodate any uncertainties in the transmission characteristics of the inter-cluster communication path 140.

The preferred embodiment of the extendible clock mechanism of the present invention takes advantage of the frequency-locked nature of inter-cabinet clock signals to implement a phase-independent communication scheme. In such a phase-independent communication scheme, the data can be read out of the parallel buffer 150 using the receiver clock, while the parallel buffer 150 is simultaneously being written into using the transmitted clock, without risk of overreading or overwriting the parallel buffer 150. Thus, the preferred embodiment of the extendible dock mechanism can utilize the performance advantage of synchronized communication systems without incurring the associated risks or problems associated with such systems, particularly in those situations where the parallel processing computer system has an extendible number of clusters 100 that are physically separated by distances greater than one clock cycle.

The cluster communication output port 132 includes both a transmit data latch 136 and a transmit clock 138. Although the transmitted data and clock signal will be frequency locked because both are generated by the frequency locked, phase-independent local clock signal at the transmitter, there is not necessarily any phase consistency between the received data and the receiver clock signals. It will be understood that an out-of-phase condition can arise between the received data and receiver clock signals over the same inter-cluster communication path 140 due to different skewed tolerances over the transmission length of the inter-cluster clock distribution path (not shown), particularly when the length of the communication path 140 exceeds the "length" of a clock cycle of the parallel computer processing system. When the inter-cluster communication path 140 is multiple clock cycles long, the cluster communication input port 134 may receive the transmitted data and transmitted clock signals after some period of N clock cycles, plus or minus M clock cycles, where N is the length of the communication path 140 in clock cycles and M is the length of the skew of the communication path 140 also in clock cycles.

The cluster communication input port 134 uses the parallel buffer 150 to effectively deskew the transmitted data and clock signals and the read clock signals. A received clock generator circuit 152 captures the transmitted clock signal and uses this signal to clock a receive latch circuit 154 to latch the transmitted data signal. The latched data signal is then written into the parallel buffer 150 using a write pointer 156 that is also clocked by the received clock generator circuit 152. A separate read pointer 158 that is clocked by the local clock signal 142 is then used to read the transmitted data out of the buffer 150. The size of the parallel buffer 150 is determined by the uncertainty N in the inter-cluster communication path 140, such that the minimum size of the buffer will be two times N plus one. The read pointer 158 and write pointer 156 are also spaced apart on system startup by at least N locations in the parallel buffer 150. A pair of disable AND circuits 144 insure that spurious signals on the inter-cluster communication path 140 are not stored in the parallel buffer 150 when the computer system is not in operation.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A unified parallel processing architecture for connecting together an extendible number of clusters of multiple numbers of processors to create a parallel processing computer system, the unified parallel processing architecture comprising:

four or more clusters of multiprocessors, each cluster comprising:
 a cluster shared memory means for storing and retrieving data and instructions for one or more parallel tasks of one or more computer programs;
 two or more processor means for executing the instructions and operating directly on the data for the parallel tasks that are stored in the cluster shared memory means;
 one or more input/output port means for transferring the data and instructions for the parallel tasks between the cluster shared memory means and one or more external data sources via one or more block-by-block communication paths; and
 connection node means for connecting the cluster shared memory means with all of the processor means in the cluster such that access to the clustered shared memory means by all of the processor means in the cluster is symmetrical;
means for providing a plurality of floating shared memories by adjacently connecting some, but not all of the clusters, via one or more word-by-word communication paths to create a floating shared memory that is defined by the cluster shared memory means of the cluster and the cluster shared memory means of any adjacently interconnected clusters and that can be programmed using a shared memory model; and
means for providing an extended distributed memory among any non-adjacently interconnected clusters that defines an extendible address space encompassing the cluster shared memory means of all clusters that can be programmed using a distributed memory model.

2. The parallel processing architecture of claim 1 further comprising:
means for providing an extendible clock signal to each cluster.

3. The parallel processing architecture of claim 1 further comprising:
means for providing an extendible control mechanism for each cluster that is accessible by a distributed operating system program executing on any of the processor means in any of the clusters for distributively controlling the communication and coordination among a plurality of processes executing in parallel in the computer processing system.

4. The parallel processing architecture of claim 1 wherein the means for providing a plurality of floating shared memories comprises:
two or more cluster connection means for each cluster for adjacently connecting all of the processor means in the cluster with the cluster shared memory means in two or more, but not all, of the other clusters via one or more word-by-word communication paths such that the processor means can execute the instructions and operate directly on the data for the parallel tasks that are stored in any of the cluster shared memory means of any of the adjacently connected clusters.

5. The parallel processing architecture of claim 4 wherein either an input/output port means or a cluster connection means can be interchangeably connected to shared memory means via the connection node means and wherein the total number of input/output port means and cluster connection means is fixed for each cluster and the ratio of input/output is configurable.

6. The parallel processing architecture of claim 1 wherein the means for providing an extended distributed memory comprises:
a message passing scheme implemented in an operating system program executing in one or more processors of each cluster such that messages may be passed among the processor means in all of the clusters in the parallel processing computer system.

7. The parallel processing architecture of claim 1 wherein the means for providing an extended distributed memory comprises:
a floating scheme implemented in an operating system program executing in one or more of the processor means in each cluster such that one or more segments of data or instructions for a parallel task are moved from the floating shared memory of one set of adjacently interconnected clusters to the floating shared memory of another set of adjacently interconnected clusters.

8. The parallel processing architecture of claim 1 where the connection node means comprises:
two or more arbitration node means, each arbitration node means having two or more unique unidirectional direct connection paths between the cluster shared memory means and a unique two or more of the processor means for symmetrically multiplexing the unique two or more processor means to the clustered shared memory means.

9. The parallel processing architecture of claim 1 wherein clusters are adjacently interconnected if the average memory latency of an inter-cluster memory access by a processor means in one cluster to the cluster shared memory means of another cluster is less than ten times greater than the average memory latency of an intra-cluster memory access by a processor means to the cluster shared memory means within that cluster and the average number of the inter-cluster memory accesses is less than ten percent of the number of intra-cluster memory accesses for an average parallel task.

10. The parallel processing architecture of claim 9 wherein clusters are adjacently interconnected if the average memory latency of an inter-cluster memory access is less than five times greater than the average memory latency of an intra-cluster memory access and the average number of the inter-cluster memory accesses is less than five percent of the number of intra-cluster memory accesses for an average parallel task.

11. The parallel processing architecture of claim 9 wherein clusters are adjacently interconnected if the average memory latency of an inter-cluster access is less than about two times greater than the average memory latency of an intra-cluster access and the average number of the inter-cluster memory accesses is less than one percent of the number of intra-cluster memory accesses for an average parallel task.

12. A method for providing a unified parallel processing architecture for a parallel processing computer system that can process one or more computer programs in parallel, each computer program having a problem space of a predetermined size, the method comprising the steps of:
   (a) providing 4 or more clusters of multiprocessors, each cluster having 2 or more processors that are symmetrically connected to a cluster shared memory such that each processor in the cluster has a similar average memory latency when accessing the cluster shared memory;
   (b) adjacently interconnecting each cluster to some, but not all, of the other clusters;
   (c) remotely interconnecting each cluster to all other clusters to which that cluster is not adjacently interconnected;
   (d) using a shared memory model to process in parallel any computer programs having a problem space of a size that is less than the size of a floating shared memory defined by the collective cluster shared memories of a set of adjacently interconnected clusters; and
   (e) using a distributed memory model to process in parallel any computer programs having a problem space of a size that is greater than the size of the floating shared memory.

13. The method of claim 12 wherein clusters are adjacently interconnected if the average memory latency of an inter-cluster memory access by a processor in one cluster to the cluster shared memory of another cluster is less ten times greater than the average memory latency of an intra-cluster memory access by a processor to the cluster shared memory within that cluster and the average number of the inter-cluster memory accesses is less than ten percent of the number of intra-cluster memory accesses for an average parallel task.

14. The method of claim 13 wherein clusters are adjacently interconnected if the average memory latency of an inter-cluster memory access is less than five times greater than the average memory latency of an intra-cluster memory access and the average number of the inter-cluster memory accesses is less than five percent of the number of intra-cluster memory accesses for an average parallel task.

15. The method of claim 13 wherein clusters are adjacently interconnected if the average memory latency of an inter-cluster access is less than about two times greater than the average memory latency of an intra-cluster access and the average number of the inter-cluster memory accesses is less than one percent of the number of intra-cluster memory accesses for an average parallel task.

16. The method of claim 12 further comprising the step of:
   (f) providing each cluster with an extendible clock signal.

17. The method of claim 12 further comprising the step of:
   (f) providing each cluster with an extendible control mechanism that is accessible by a distributed operating system program executing on any of the processors in any of the clusters for distributively controlling the communication and coordination among a plurality of processes executing in parallel in the computer processing system.

18. The method of claim 12 wherein step (e) comprises:
   using a message passing scheme implemented in an operating system program executing in one or more processors of each cluster to pass messages among the processors in all of the clusters in the parallel processing computer system.

19. The method of claim 12 wherein step (e) comprises:
   using a floating scheme implemented in an operating system program executing in one or more of the processor means in each cluster to move one or more segments of data or instructions for a parallel task from the floating shared memory of one set of adjacently interconnected clusters to the floating shared memory of another set of adjacently interconnected clusters.

20. A unified parallel processing architecture for connecting multiple processors to multiple memory components to form a parallel processing computer system comprising:
   four or more cluster means for connecting a plurality of processors to one or more memory components such that the processors can symmetrically access the one or more memory components using a shared memory model;
   two or more floating shared memory means for uniquely and adjacently connecting some, but not all, of the plurality of the cluster means such that the processors in a floating shared memory means can access any of the memory components in the floating shared memory means using an extended shared memory model; and
   distributed memory communication means for providing communication among any of the cluster means that are not adjacently connected by a floating shared memory means such that any of the processors in the parallel processing computer system can access any of the memory components in the parallel processing computer system using a distributed memory model.

21. A multiprocessor cluster adapted to be connected to other similar clusters in a parallel processing computer system, the multiprocessor cluster comprising:
   a cluster shared memory means for storing and retrieving data and instructions for one or more parallel tasks of one or more computer programs;
   two or more processor means for executing the instructions and operating directly on the data for the parallel tasks that are stored in the cluster shared memory means;
   one or more input/output port means for transferring the data and instructions for the parallel tasks between the cluster shared memory means and one or more external data sources via one or more block-by-block communication paths;
   connection node means for connecting the cluster shared memory means with all of the processor means in the cluster such that access to the clustered shared memory means by all of the processor means in the cluster is symmetrical; and two or more cluster connection means for adjacently connecting all of the processor means in the cluster with the cluster shared memory means of two or more other clusters via one or more word-by-word communication paths such that the processor means can execute the instructions and operate directly on the data for the parallel tasks that are stored in any of the cluster shared memory means of any of the adjacently connected clusters, wherein the input/output port means and the cluster connection means can be interchangeably connected to the shared memory means via the connection node means and wherein the total number of input/output port means and cluster connection means is fixed for each cluster and the ratio of input/output is configurable.

22. The multiprocessor cluster of claim 21 wherein the connection node means comprises:

two or more arbitration node means, each arbitration node means having two or more unique unidirectional direct connection paths between the cluster shared memory means and a unique two or more of the processor means for symmetrically multiplexing the unique two or more processor means to the clustered shared memory means.

23. The multiprocessor cluster of claim 22 wherein each arbitration node means also provides a unique connection to the shared memory means for two input/output port means or one cluster connection means.

24. The multiprocessor cluster of claim 23 wherein the cluster communication means comprises:

an inter-cluster dispatch means operably connected to all of the arbitration node means for receiving one or more inter-cluster memory accesses from any of the processors in the multiprocessor cluster;

a cluster connection output port means operably connected to one of the arbitration node means for transferring one or more inter-cluster memory accesses from the inter-cluster dispatch means to any adjacently connected cluster; and a cluster connection input port means operably connected to the same one of the arbitration node means for receiving one or more inter-cluster memory accesses from any of the processors in any adjacently connected cluster and presenting the one or more inter-cluster memory accesses from any of the processors in any adjacently connected cluster to the cluster shared memory of the multiprocessor cluster via the same one of the arbitration node means.

* * * * *

UNITED STATES PATENT AND TRADEMARK OFFICE
CERTIFICATE OF CORRECTION

PATENT NO. : 5,428,803

DATED : June 27, 1995

INVENTOR(S) : Steve S. Chen, et al.

It is certified that error appears in the above-indentified patent and that said Letters Patent is hereby corrected as shown below:

Column 4, Line 54, please delete "dose" and insert --close-- therefore.

Column 17, under Table I, please delete "N1 - V1" and insert --N1 + V1-- therefore Signed and Sealed this Twenty-sixth Day of December, 1995

Attest:

BRUCE LEHMAN

*Attesting Officer*     *Commissioner of Patents and Trademarks*